(12) United States Patent
Lee

(10) Patent No.: US 12,359,651 B2
(45) Date of Patent: Jul. 15, 2025

(54) ROTATIONAL FORCE GENERATOR REVOLVING AND ROTATING ACCORDING TO FLOW OF FLUID

(71) Applicant: Sang Cheol Lee, Goyang-si (KR)

(72) Inventor: Sang Cheol Lee, Goyang-si (KR)

(*) Notice: Subject to any disclaimer, the term of this patent is extended or adjusted under 35 U.S.C. 154(b) by 0 days.

(21) Appl. No.: 18/553,016

(22) PCT Filed: Apr. 6, 2022

(86) PCT No.: PCT/KR2022/004985
§ 371 (c)(1),
(2) Date: Sep. 28, 2023

(87) PCT Pub. No.: WO2022/220481
PCT Pub. Date: Oct. 20, 2022

(65) Prior Publication Data
US 2025/0075679 A1    Mar. 6, 2025

(30) Foreign Application Priority Data
Apr. 11, 2021 (KR) .......................... 10-2021-0046837

(51) Int. Cl.
| | |
|---|---|
| *F03D 3/00* | (2006.01) |
| *F03D 3/06* | (2006.01) |
| *F03D 15/00* | (2016.01) |

(52) U.S. Cl.
CPC .............. *F03D 3/005* (2013.01); *F03D 3/06* (2013.01); *F03D 3/061* (2013.01); *F03D 3/066* (2023.08); *F03D 3/067* (2013.01); *F03D 15/00* (2016.05); *F05B 2240/211* (2013.01)

(58) Field of Classification Search
CPC . F03D 3/005; F03D 3/06; F03D 3/061; F03D 3/066; F03D 3/067; F03D 15/00; F05B 2240/211
See application file for complete search history.

(56) References Cited

U.S. PATENT DOCUMENTS 330,014 A * 11/1885 Gilman ................. F03D 7/0208
416/17
2009/0202346 A1    8/2009 Baron

FOREIGN PATENT DOCUMENTS

| CN | 111456892 A | * 7/2020 | ............. F03D 15/00 |
|---|---|---|---|
| FR | 2930301 A1 | * 10/2009 | ............... F03D 3/06 |
| KR | 10-2009-0102282 A | 9/2009 | |
| KR | 10-1080323 B1 | 11/2011 | |

(Continued)

*Primary Examiner* — Audrey B. Walter
(74) *Attorney, Agent, or Firm* — NKL Law; Jae Youn Kim

(57) ABSTRACT

A rotational force generator is for converting fluid flow energy (e.g., wind or water currents) into rotational force. This generator has blades that simultaneously rotate on their shafts and revolve around a central revolution shaft, ensuring continuous positive torque generation. This generator automatically aligns with the fluid flow direction without requiring external power or control mechanisms. Its novel and innovative gear-shifting mechanism optimizes rotation speeds, enhancing energy conversion efficiency. The generator's modular and scalable design enables practical deployment in urban and rural environments, such as roadsides, railways, and coastal areas. By eliminating friction losses and maximizing energy output, this invention significantly advances renewable energy generation for wind and hydro power applications.

6 Claims, 19 Drawing Sheets

(56) References Cited

FOREIGN PATENT DOCUMENTS

KR  10-1525553 B1  6/2015
KR  20180135147 A  * 12/2018  ............. F03D 15/00

* cited by examiner

-PRIOR ART-

-PRIOR ART-

ROTATIONAL FORCE GENERATOR REVOLVING AND ROTATING ACCORDING TO FLOW OF FLUID

TECHNICAL FIELD

The present invention relates to a vertical rotating shaft type rotational force generator that is capable of allowing a plurality of blades rotating around blade rotation shafts and simultaneously revolving around blade revolution shafts, when receiving a pressure caused by the flow of a fluid, to provide the rotational forces generated therefrom for the blade revolution shafts.

More specifically, the present invention relates to a vertical rotating shaft type rotational force generator that is capable of allowing blade revolution shafts to automatically move toward positions where rotational forces generated therein are maximized, even if the flowing directions of the fluid are changed frequently and no separate left and right direction control power device exists, and allowing rotation phase angles and revolution phase angles of a plurality of blades to effectively interlock with each other, so that even though the blades are located at any revolution phases, they provide the rotational forces produced to the maximum according to revolution phase always in the same rotation direction for the blade revolution shafts.

Further, the present invention relates to a vertical rotating shaft type rotational force generator that is capable of allowing blade revolution shafts to be automatically tilted in a direction where the overturning moment generated in the support and foundation of the rotational force generator and the rotating torque generated in the blade revolution shafts of blades are drastically decreased, without having any separate upward and downward direction control power device, in the case where the flow velocity and pressure of a fluid are excessively increased due to strong winds or floods, so that the rotational force generator is prevented from turning over or collapsing due to the excessive dynamic load of the fluid, and further, the rotational force generator including each blade revolution shaft is prevented from being damaged due to excessive rotational speeds, thereby optimizing the efficiency and safety thereof.

BACKGROUND ART

A rotational force generator, which is configured to have blades moving by the pressure of a fluid flowing to provide their rotational forces for their rotating shafts, is classified into a "horizontal rotating shaft" type rotational force generator in which a rotating shaft of each blade is parallel to the flowing direction of the fluid and a "vertical rotating shaft" type rotational force generator in which the rotating shaft of each blade is vertical to the flowing direction of the fluid. The two types of rotational force generators have the following advantages and disadvantages.

The "horizontal rotating shaft" type rotational force generator is advantageous to be large in scale, but since the moving directions of the blades are perpendicular to the moving direction of the fluid, friction, vibrations, noise, and energy loss may be greatly generated among rotating members and supporting members. As a result, the horizontal rotating shaft type rotational force generator needs a wind with a speed of 6 m/s or more.

The "vertical rotating shaft" type rotational force generator has somewhat differences according to Darrieus type wind generator and Savonius type wind generator. In this case, forward (+) rotational forces are generated in a 180° phase section where blades move in the flowing direction of the fluid among the entire 360° phase section, but backward (−) rotational forces are generated in a 180° phase section where the blades move against the flow of the fluid, so that the efficiency in generating the rotational forces may be lowered.

Further, in the case of the vertical rotation shaft type wind turbines as suggested in conventional patent literatures 1, 2 and 3 as will be mentioned below, since blades rotate at an angular velocity of ½ of a revolution angular velocity in the opposite direction to their revolution direction, only if rotation phases according to revolution phases are set to allow, on two points at which the direction of a blade revolution shaft toward blade rotation shafts is perpendicular to the flowing direction of the fluid, the vertical direction to the surface of the blade to be vertical to the flowing direction of the fluid at one point and to be parallel to the other point, the backward (−) rotational forces are not generated even when the blades are located at any revolution phase, and the flowing energy of the fluid is converted into the forward (+) rotational energy of the blades to the maximum.

However, in the case of the vertical rotation shaft type wind turbine as suggested in the conventional patent literature 1, 2 or 3, if the flowing directions of the fluid are changed frequently, it is hard to accurately adjust a relation between the flowing direction of the fluid and the revolution phase angles of the blades at appropriate time, and only when a separate direction control device using external power is provided, it is possible to perform accurate direction control. Further, the areas of the blades are very larger than those in the horizontal rotating shaft type wind turbine, and a high fluid pressure is applied always to the front surfaces of the blades, so that if the flow velocity of the fluid becomes fast due to strong winds or floods, the wind turbine may be exposed to the risk of collapse or overturning, thereby having a limitation in making the wind turbine larger in scale.

PRIOR ART LITERATURE (Patent literature 1) Korean Patent Application Laid-open No. 10-2009-0102282 (Blade rotation type vertical shaft wind turbine)
(Patent literature 2) Korean Patent No. 10-1080323 (Blade direction control device for wind turbine)
(Patent literature 3) Korean Patent No. 10-1525553 (Vertical rotor type wind turbine)
(Patent literature 4) Korean Patent No. 10-0954760 (Windmill for wind turbine)

DISCLOSURE

Technical Problem

In the case of the rotational force generators using wind as suggested in the conventional patent literatures 1 to 3, two or more blades revolve around one blade revolution shaft and rotate at an angular velocity of ½ of a revolution angular velocity in the opposite direction to their revolution direction, thereby providing rotational forces generated for the blade revolution shaft.

Under such a principle of the vertical rotating shaft wind generator, if it is assumed that the number of blades is 2 and the flowing direction of a fluid is located at a revolution phase angle of 90°, when the rotation phase angle of one blade at the revolution phase angle of 0° is 0° (90° in the case of the other blade), energy efficiency is maximized, and when the rotation phase angle is +45° (or −45°), the energy efficiency in generating the rotational forces becomes 0 (zero).

However, since all of objects receiving the pressure of a fluid have properties moving in a direction where the areas receiving the pressure are minimized so as to minimize energy loss, unless the movements of the blades are changed through a separate direction control device, the blade rotation shafts move in a direction where the rotation phase angle of one blade at the revolution phase angle of 0° is +45° and the rotation phase angle of the other blade is −45° and then stop, thereby causing the function of generating the rotational forces to be lost.

To solve such a problem of the rotational force loss, in the case of the conventional patent literature 1, a rudder having the same principle as a wind vane is additionally provided to control the directions of the blades, but the conventional patent literature 1 fails to be patented. In the case of the conventional patent literatures 2 and 3, a wind direction sensor and a separate power generation means are provided to control the directions of the blades, and they are patented.

In the case of the conventional patent literature 1, it is possible to somewhat change the directions of the blades by means of the rudder, but since the changed rotation angle falls far short of 90°, the energy efficiency in generating the rotational forces becomes very low.

However, the energy efficiency in generating the rotational forces in the conventional patent literatures 2 and 3 is bound to be lower than that in the conventional patent literature 1. In this case, even if it is assumed that no energy loss exists, the direction control of the blades is possible only when the force and energy consumed for controlling the directions of the blades through the power generation means are larger than those generated by the rotations and revolutions of the blades, but this violates the first law of thermodynamics (law of conservation of energy). In the case of the conventional patent literature 3, further, rotating directions of a blade having the shape of an airfoil and a rotor are in the opposite directions to directions in real phenomenon, which ignores that the drag coefficient by the shape of the blade is higher than a lift coefficient. This can be easily checked through the blade shapes of the Savonius type rotational force generator and the rotating directions of the blades.

Furthermore, in the case of the vertical rotating shaft type rotational force generators as suggested in the conventional patent literatures 1 to 3, the areas of the blades receiving the dynamic load of the fluid are at least three times larger than the areas of blades with the same size of the horizontal rotating shaft (propeller) type rotational force generator, and accordingly, when the flow velocity and pressure of the fluid are increased rapidly due to strong winds or floods, the risk of overturning and collapse also increases in proportion to the difference in the areas of the blades.

Therefore, the vertical rotating shaft type rotational force generators as suggested in the conventional patent literatures 1 to 3 are very low in energy efficiency and practicability and have a high degree of risk of overturning and collapse, so that they cannot be utilized for a large-scale wind generator, unlike the horizontal rotating shaft type rotational force generator.

The present invention is proposed to remove the problems the existing inventions have had, and the present invention relates to a rotational force generator that converts kinetic energy in the flowing direction of a fluid into kinetic energy in the revolving direction of blades, like a windmill or water wheel, while having the following objects.

(1) Frictions, noise, vibrations, and energy loss, which are generated among the members rotating while resisting against forces pushed toward rotating shafts in the horizontal rotating shaft type rotational force generator, can be prevented from occurring in the rotational force generator of the present invention.

(2) Even while the rotational force generator of the present invention is serving as a vertical rotating shaft type generator, only forward (+) rotational energy can be produced to the maximum according to revolution phase in the entire revolution section of 360° where the blades revolve around a revolution shaft.

(3) Even though a separate rudder or power supply does not exist, the directions (rotation phase angles) of each blade according to revolution phases are automatically adjusted toward optimal directions in correspondence with the flowing directions of the fluid changed frequently.

(4) If the flow velocity of the fluid becomes excessively fast, the orthographic projection area in the direction of the flow velocity of the blade and the pressure of the fluid are exponentially decreased, so that it is possible to make rotational force generator large in scale without the risk of collapse or overturning due to strong winds or floods.

(5) If the flow velocity of the fluid becomes excessively fast, the pressure of the fluid in a revolution direction of each blade is exponentially decreased, so that blade rotating devices or power generating equipment can be prevented from being damaged due to excessive rotational speed.

(6) Even when the types and flow velocities of fluids are the same, the rotational force generator of the present invention has the shapes of blades capable of generating a larger amount of energy of more than 10% than those as suggested in the conventional patent literatures 1 to 3.

(7) Rotational force transmission between the blade revolution shaft and each blade rotation shaft is performed simply and efficiently, when compared with the method using spur gears, bevel gears, or a chain belt.

(8) No additional friction energy loss occurs no matter how much the length of the blade revolution arm is increased so that the blades can revolve effectively and generate large rotation moment even with low flow velocity and hydraulic pressure of the fluid.

(9) It can be conveniently and aesthetically installed on spare land such as roadsides, railway sides, coasts, etc., or on existing structures such as streetlights or utility poles, and can be used for the efficient generation of new and renewable energy.

As such, the present invention aims to provide a rotational force generator that maximizes the efficiency of generating rotational force using the kinetic energy of fluid flow such as aa wind power or water power, is safe, practical, and has high industrial value.

Technical Solution

To achieve the objects of the present invention, a rotational force generator using the flow of a fluid according to the present invention may include:

blade revolution shaft rotating mechanisms each having two or more blades spaced apart from one another at intervals of the same revolution phase angle to rotate around blade rotation shafts and simultaneously revolve around a blade revolution shaft, if a pressure is received from the fluid flowing to one side, to apply rotational forces to the blade revolution shaft; one or more left and right rotating mechanism coupling units for combining one or more blade revolution shaft rotating mechanisms provided on each of left and right sides of the central portion thereof; and a rotating mechanism coupling unit support for supporting the left and right rotating mechanism coupling units and serving as a revolution shaft to allow the left and right rotating mechanism coupling units to perform revolutions through which the left and right rotating mechanism coupling units are pushed by the pressure in the flowing direction of the fluid and automatically move toward positions and directions where the rotational forces generated therein are optimized.

The rotating mechanism coupling unit support may include: a rotating mechanism coupling unit revolution shaft serving as the revolution shaft adapted to revolve the left and right rotating mechanism coupling units therearound; rotating mechanism coupling unit revolution arms for supportingly connecting the left and right rotating mechanism coupling units to the rotating mechanism coupling unit revolution shaft in such a way as to be symmetrical to each other on left and right sides; and a rotational force generator base for supporting the rotating mechanism coupling unit revolution shaft and serving as a shaft support.

The left and right rotating mechanism coupling units may include: left and right rotating mechanism coupling arms for supportingly connecting the one or more blade revolution shaft rotating mechanisms located on the left and right sides of the central portion of the rotational force generator to each other in a horizontal direction; and blade revolution shaft supports located on both sides of the left and right rotating mechanism coupling arms at given intervals in such a way as to fit the blade revolution shafts thereto.

In this case, if the left and right rotating mechanism coupling units are provided with two or more left and right rotation mechanism coupling arms up and down along the vertical direction, a left and right rotation mechanism coupling column may be additionally provided to vertically connect and support the central portion of each left and right rotation mechanism combination arm.

Each blade revolution shaft rotating mechanism may include: the blade revolution shaft fitted to the corresponding blade revolution shaft support and extending in a vertical direction; blade revolution arms extending around the blade revolution shaft at the same revolution distances and phase intervals as each other; blade rotation shaft supports disposed on the ends of the blade revolution arms; blade rotation shafts fitted to the blade rotation shaft supports in directions parallel to the blade revolution shaft; and a revolution and rotation gear shifting interlocker for shifting the rotational speed of the blade revolution shaft to allow the blade rotation shafts to rotate at an angular velocity 0.5 times higher than the angular velocity of the blade revolution shaft in the opposite direction to the rotating direction of the blade revolution shaft.

The blade, which has two thin curved bodies with almost the same shape and area in such a way as to be coupled to have line symmetry around the corresponding blade rotation shaft, is fixedly coupled to the blade rotation shaft, and in a relation between the revolution phase angle and the rotation phase angle of each blade, in the case of one revolution phase, in two revolution phases at which the horizontal direction where the left and right rotating mechanism coupling arms extend and the revolution orbit of the corresponding blade rotation shaft cross each other, the direction vertical to the surface of the blade is vertical to the direction where the left and right rotating mechanism coupling arms extend, and in the case of the other revolution phase, the direction vertical to the surface of the blade is parallel to the direction where the left and right rotating mechanism coupling arms extend.

Even though the flowing directions of the fluid are changed frequently, since the left and right rotating mechanism coupling units pushedly rotate by the flow of the fluid and move toward the most downward directions of the flow of the fluid, the rotating mechanism coupling unit revolution arms are always toward directions parallel to the flow of the fluid, and the left and right rotating mechanism coupling units are toward the directions vertical to the flow of the fluid, so that each blade has a rotation phase angle at which the rotational force can be produced to the maximum according to revolution phases.

Therefore, even if the flowing directions of the fluid are varied and the blades are located at any revolution phases, the rotational force generator of the present invention using the flowing energy of the fluid as a power source provides the torques produced to the maximum using the flow of the fluid, through the blades rotating in the same directions, for the blade revolution shafts.

The rotational force generator according to the present invention may further include the following solutions.

(1) To allow the left and right rotating mechanism coupling column (or the left and right rotating mechanism coupling arms) of the left and right rotating mechanism coupling units to rotate in place in upward and downward directions through a rotating mechanism coupling unit rotating horizontal shaft as a member extending in a horizontal direction, the left and right rotating mechanism coupling arms are hinge-coupled to the ends of the rotating mechanism coupling unit revolution arms, and in this case, a point of the left and right rotating mechanism coupling units to which the rotating mechanism coupling unit rotating horizontal shaft is coupled has to be at a higher position than the center of gravity in the vertical direction.

Under such a functional structure, if the flow velocity of the fluid is slow, the left and right rotating mechanism coupling units hang in almost vertical directions around the rotating mechanism coupling unit rotating horizontal shaft by means of their own weight, and if the flow velocity and pressure are gradually increased, the inclinations of the left and right rotating mechanism coupling units become increased, so that unlike that the left and right rotating mechanism coupling units are always in the vertical states, the dynamic load of the fluid applied to the rotational force generator can be drastically decreased.

(2) Each blade has a straight line shape where no concave and convex portions are formed on the horizontal section thereof and a plurality of concave and convex portions or protrusions formed on the vertical section thereof.

Under such a functional shape, the fluid colliding against the blade does not scatter in every direction and flows along horizontal trenches formed on the blade to perfectly transmit kinetic energy to the blade, so that the energy generation efficiency of the blade increases by more than at least 10%.

(3) In the case of the revolution and rotation gear shifting interlocker, a crank mechanism having a radial crank pin connection arm is used as a means for transmitting the rotational force between the blade revolution shaft and each blade rotation shaft, and a revolution and rotation gear shifting planetary gear is used as a means for shifting the rotational force.

In more detail, two or more crank mechanisms each having a crank shaft, a crank arm, and a crank pin, which are the same as each other in size, are spaced apart from one another at the same rotation phase intervals on the ends of the blade revolution shaft and each blade rotation shaft of each blade revolution shaft rotating mechanism and fixedly coupled to the crank shafts in zigzag shapes in upward and downward directions.

The radial crank pin connection arms extending radially toward the blade rotation shafts around the crank pin of the blade revolution shaft are hinge-coupled between the crank pin of the blade revolution shaft and the crank pin of each blade rotation shaft, which have the same rotation phase angle, to allow the crank pins to interlock with each other and revolve around the respective crank shafts at the same phase angle and angular velocity.

The revolution and rotation gear shifting planetary gear having a sun gear and planetary gears is disposed between the blade revolution shaft and the blade revolution shaft support to allow the rotation angular velocity of the blade revolution shaft to become 0.5 times higher than the revolution angular velocity of the blade revolution arms in such a way as to be fixedly coupled to one surface of the left and right rotating mechanism coupling arms. In this case, the blade revolution shaft is divided into a revolution arm separation blade revolution shaft fixedly coupled to the crank mechanism and a revolution arm coupling blade revolution shaft as a cylindrical member surrounding the revolution arm separation blade revolution shaft in such a way as to be coupled to the blade revolution arms.

Advantageous Effects (1) Since the blade revolution shaft and the blade rotation shafts of the rotational force generator are vertical rotating shafts vertical to the flow of the fluid, no frictions, noise, vibrations, and energy loss may occur, unlike the horizontal rotating shaft wind generator where the blades are pushed against the fluid and rotate while pressurizing the rotating shaft supports.

(2) Since only the forward (+) rotational force is generated in the entire revolution section of 360° of each blade, energy production efficiency of the rotational force generator according to the present invention is at least two times higher than that of the exiting vertical rotating shaft wind generator where the forward rotational force is generated only in the revolution section of 180° and the backward rotational force is generated in the remaining revolution section of 180°.

(3) Even if the flowing directions of the fluid are changed frequently and no additional power is provided, the left and right rotating mechanism coupling units are always in a vertical direction to the flow of the fluid, and accordingly, the blades provide the rotational forces that can be produced to the maximum using the flow of the fluid according to revolution phases for their blade revolution shaft.

This will be explained in more detail. Firstly, the left and right rotating mechanism coupling units vertical to the flowing direction of the fluid rotate, while receiving the pressure of the fluid several ten times higher than the existing rudder parallel to the flowing direction of the fluid, so that they perform the function of the rudder more effectively. Secondly, if the horizontal directions of the left and right rotating mechanism coupling units are parallel to the flowing direction of the fluid, the rotational force generation functions are lost, and as the left and right rotating mechanism coupling units are close to the vertical directions, the rotational forces produced become strong, so the rotational forces that can be produced to the maximum are generated. Further, the method for controlling directions using the additional power is based on the second law of thermodynamics, and accordingly, since the energy consumed for direction control is larger than the energy produced by the rotations of the blades, high practicability cannot be ensured.

(4) Even though the flow velocity and pressure of the fluid are increased excessively due to strong winds or floods, the dynamic load of the pressure of the fluid applied to the rotational force generator is not increased largely, and further, the collapse and overturning possibilities caused thereby is not increased largely. Therefore, it is possible to implement an enlarged rotational force generator even though it is a vertical axis rotation method.

As the flow velocity and pressure of the fluid are increased, if it is assumed that inclined angles of the left and right rotating mechanism coupling units with respect to the vertical positions are $\theta$, the dynamic load by the fluid pressure decreases in proportion to the third power of Cos ($\theta$).

(5) Even though the flow velocity and pressure of the fluid are increased excessively due to strong winds or floods, excessive rotational speed causing the damage of a related system such as a generation device does not occur.

If it is assumed that inclined angles of the left and right rotating mechanism coupling units with respect to the vertical positions according to the increase of the flow velocity are $\theta$, the torque by the fluid pressure decreases in proportion to the second power of Cos ($\theta$).

(6) In the case where each blade is not bent on the horizontal section thereof and has a plurality of concave and convex portions or protrusions formed on the vertical section thereof, the flow rate of the fluid colliding against the blade, which is scattered and lost toward the blade rotation shaft, becomes decreased than that of the simple flat type blade, and contrarily, the flow rate flowing in a direction perpendicular to the blade rotation shaft to generate the rotational force is more increased than that of the simple flat type blade. The drag coefficient of the flat type blade is about 1.98, and that of the concave semispherical blade is about 2.3. Accordingly, if the concave and convex portions or protrusions are formed on the blade to induce the fluid to flow in the direction perpendicular to the blade rotation shaft, the rotational force generation energy efficiency increases by more than 10%.

(7) In the case where the crank mechanisms with the radial crank pin connection arms and the revolution and rotation gear-shifting planetary gears are used as the revolution and rotation gear shifting interlocker between the blade revolution shaft and the blade rotation shafts, they produce the rotational forces more effectively than other power transmission methods even if the flowing velocity of the fluid is slow.

If the rotational force is transmitted through gear wheels (gears) or a chain belt, the number of gear wheels or the number of chain joints is increased as the length of the blade revolution arm becomes long, and accordingly, the energy loss caused by the locking and friction generated from the connected portions may be increased. To the contrary, in the case where the crank mechanisms are used, even if the length of the blade revolution arm becomes long, the number of connected portions among the components required for power transmission is not increased to cause no additional friction energy loss, and accordingly, the lengths of the blade revolution arm and the radial crank pin connection arm can be sufficiently long, so that as the length of the blade revolution arm becomes long, the torque of the blade revolution shaft, which can be generated at the same flowing velocity of the fluid, can be increased. Further, since the two or more radial crank pin connection arms are spaced apart from each other at the same rotation phase intervals and revolve around the crank shafts, vibrations and inertial resistance caused by eccentric load are not generated at all, thereby enhancing the energy efficiency.

BEST MODE FOR INVENTION

Figure 1A:
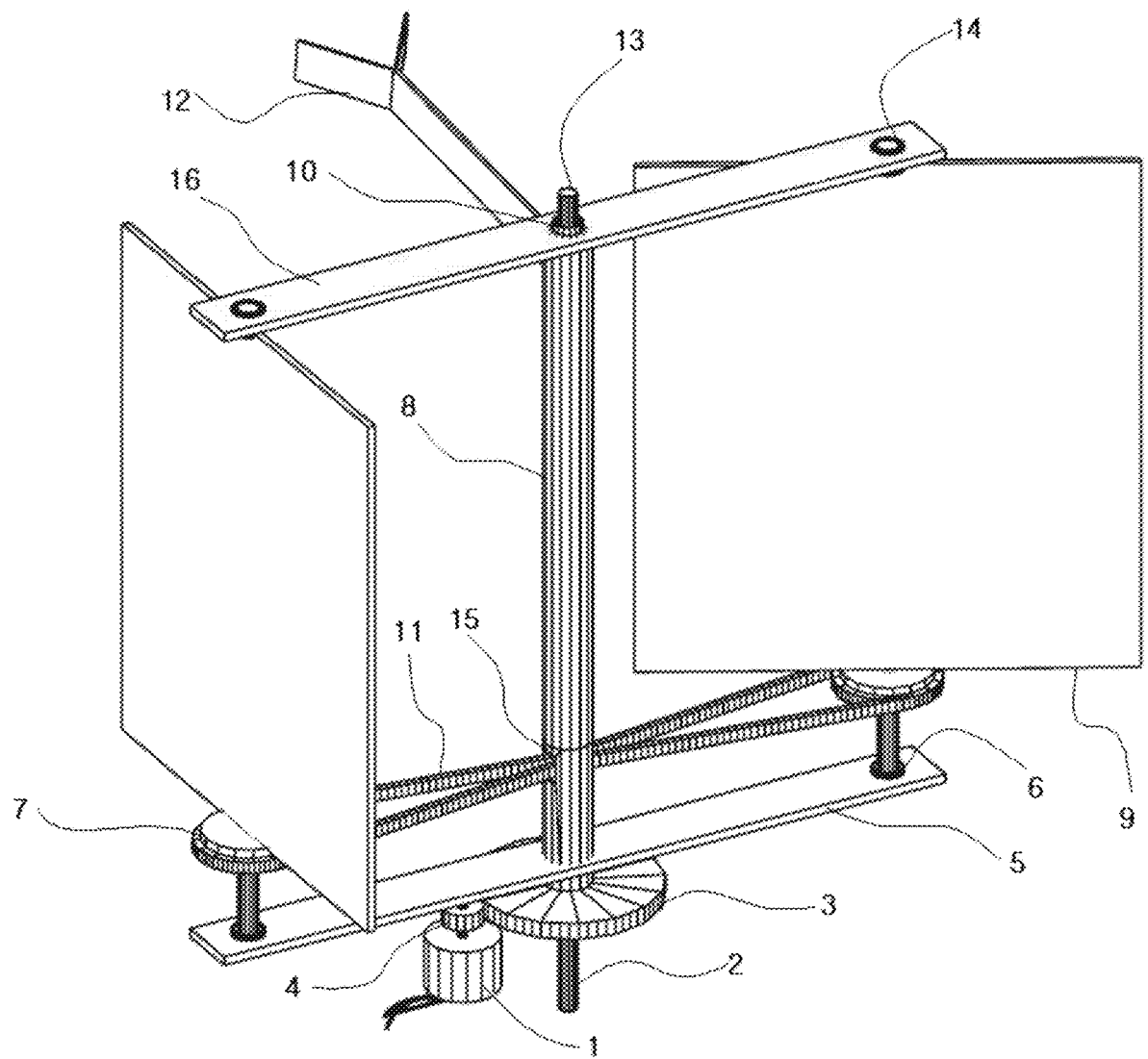
FIG. 1a is a representative figure of Patent literature 1.
Figure 1B:
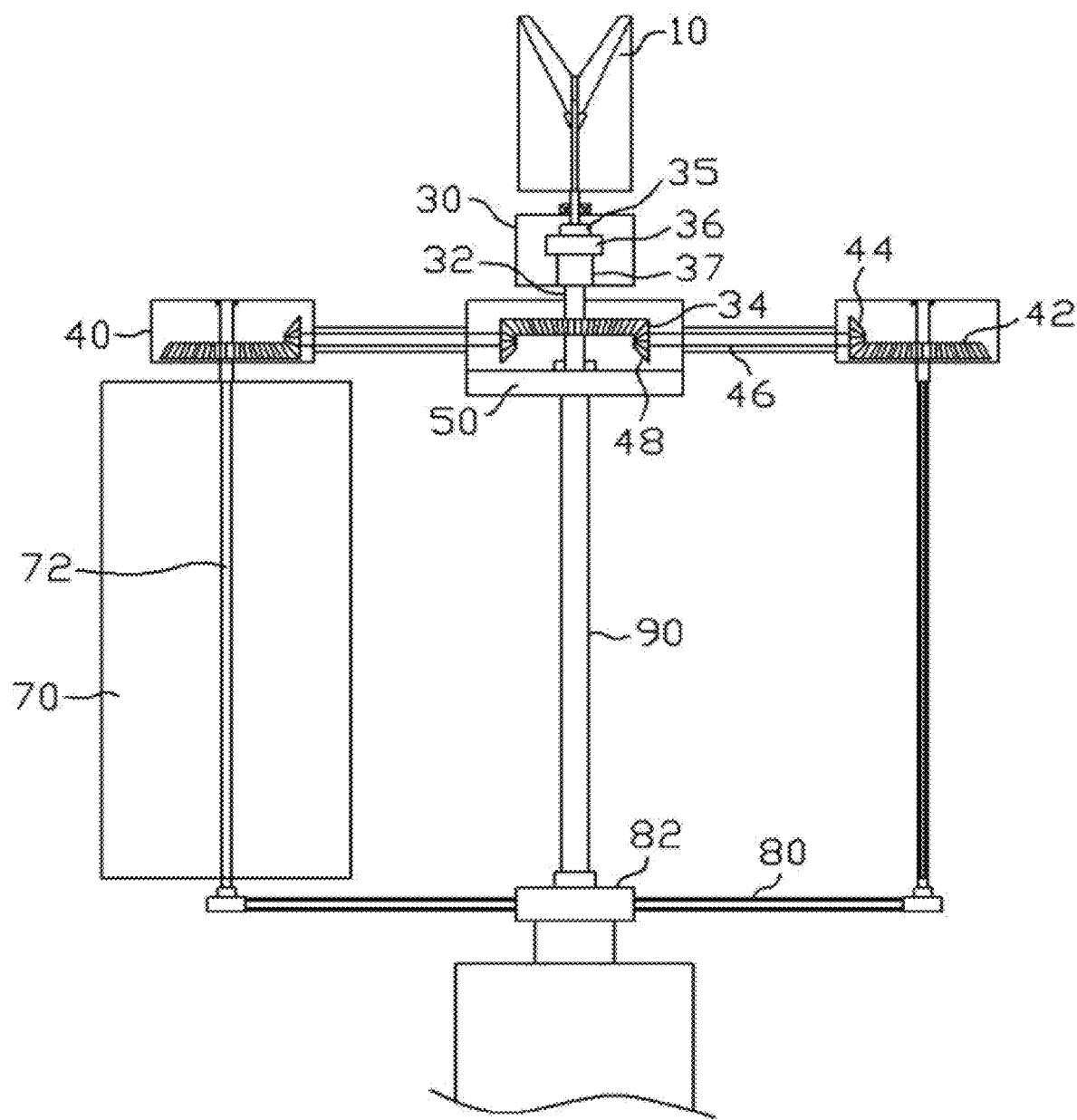
FIG. 1b is a representative figure of Patent literature 2.
Figure 1C:
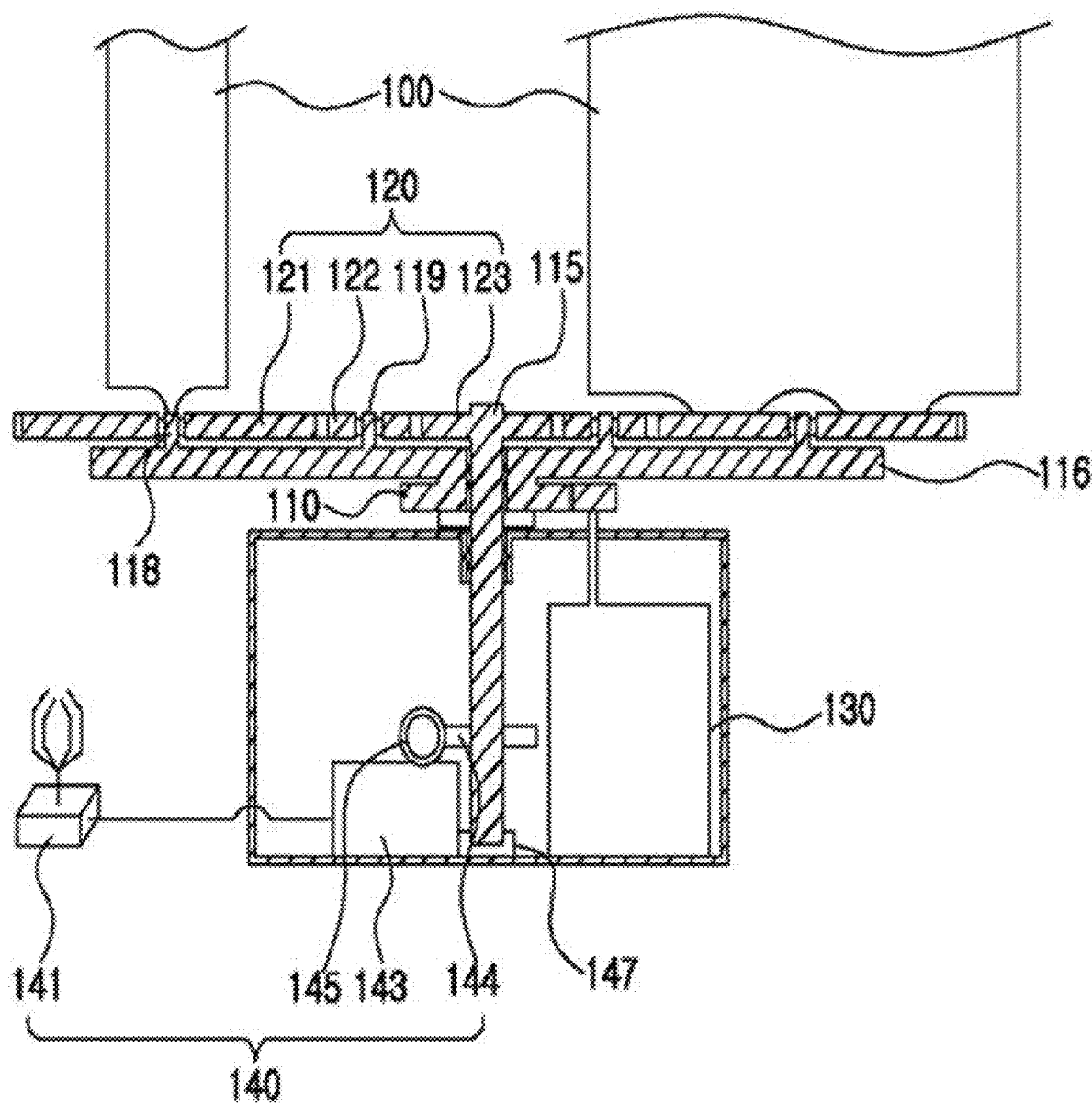
FIG. 1c is a representative figure of Patent literature 3.

Hereinafter, the present invention will be explained in detail with reference to the attached drawings. However, for reference numerals, with respect to the same elements, even though they may be displayed in different drawings, such elements use same reference numerals as much as possible, and detailed description on known elements or functions will be omitted.

Figure 2:
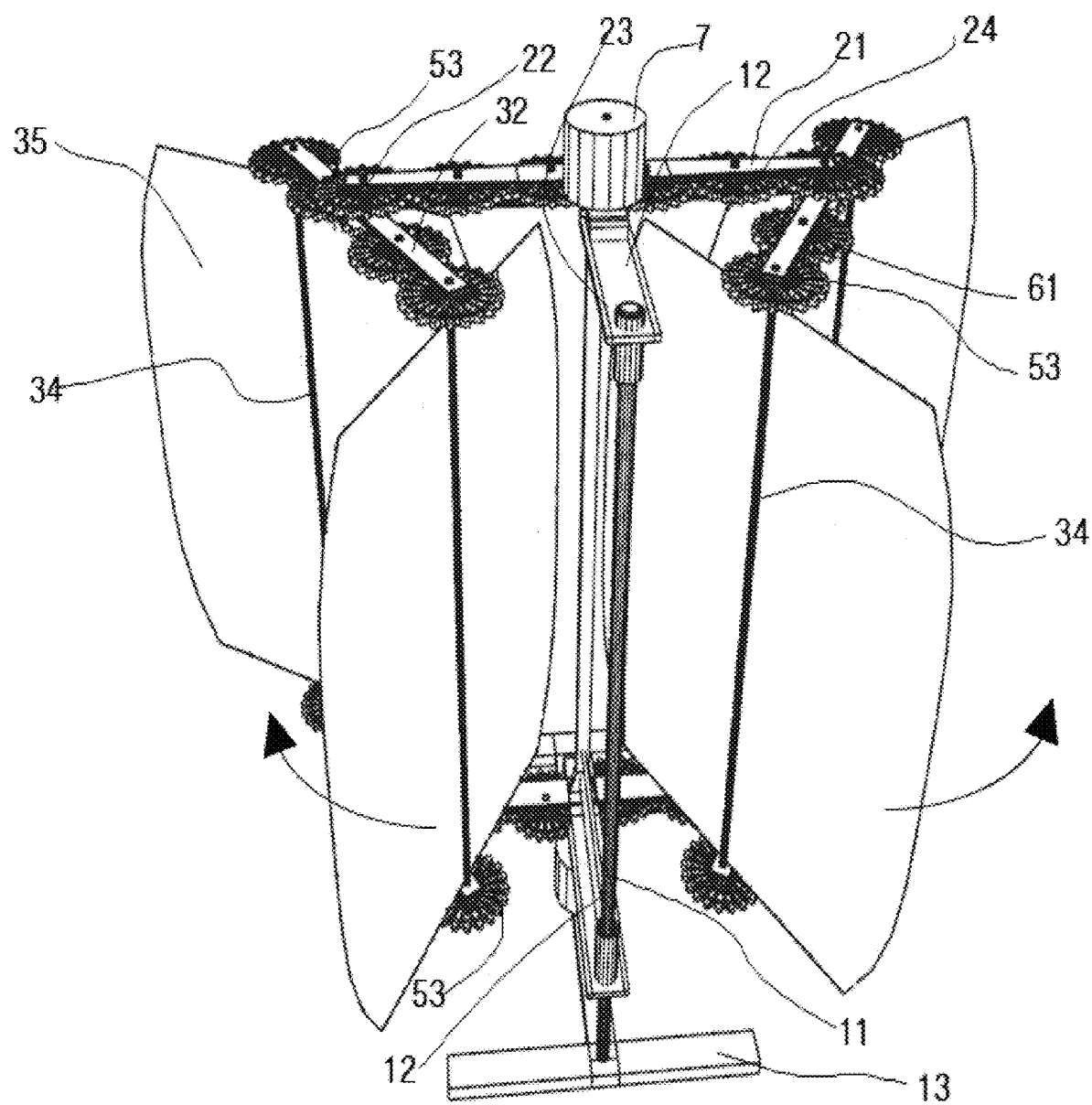
FIG. 2 is a perspective view showing a rotational force generator according to an embodiment of the present invention in which two blade revolution shaft rotating mechanisms each having two blades are coupled symmetrically to each other to transmit rotational forces through a plurality of spur gears.
Figure 5:
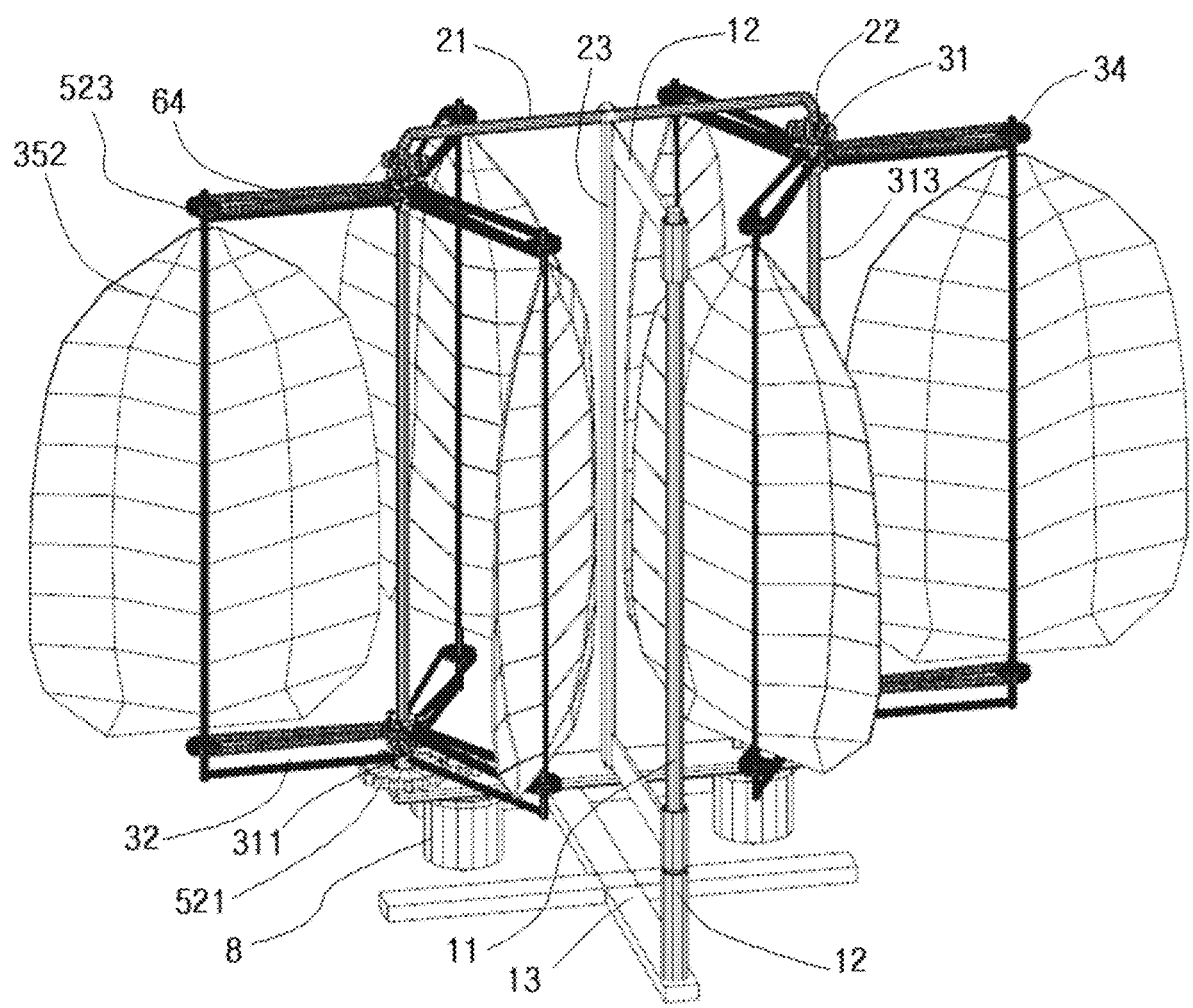
FIG. 5 is a perspective view showing a rotational force generator according to another embodiment of the present invention in which two blade revolution shaft rotating mechanisms each having three blades are coupled symmetrically to each other to transmit rotational forces through gear combinations and chain belts.

As shown in FIGS. 2, 5, 10, 13, 17a-17c, 18, and 19, a rotational force generator according to the present invention includes: blade revolution shaft rotating mechanisms 3 each having two or more blades 35 spaced apart from one another at intervals of the same revolution phase angle to rotate around blade rotation shafts 34 and simultaneously revolve around a blade revolution shaft 31, if a pressure is received from the flow of the fluid, to apply rotational forces to the blade revolution shaft 31; one or more left and right rotating mechanism coupling units 2 disposed on left and right sides with respect to the center thereof; and a rotating mechanism coupling unit support 1 for supporting the left and right rotating mechanism coupling units 2 and serving as a revolution shaft to allow the left and right rotating mechanism coupling units 2 to be pushed by the pressure of the fluid, turn in downward directions, and have a function of a rudder, even if the flowing directions of the fluid are frequently varied. The rotational force generator according to the present invention will be explained below, based on FIGS. 2 and 5 showing the basic configuration of the present invention.

<Configurations of Parts>

(1) The rotational force generator according to the present invention largely includes the left and right rotating mechanism coupling units 2 and the rotating mechanism coupling unit support 1, and further, one or more blade revolution shaft rotating mechanisms 3 having the same size and shape are located on the left and right sides with respect to a vertical central line of the left and right rotating mechanism coupling units 2.

(2) The rotating mechanism coupling unit support 1 includes: a rotating mechanism coupling unit revolution shaft 11 serving as a revolution shaft adapted to revolve the left and right rotating mechanism coupling units 2 therearound; rotating mechanism coupling unit revolution arms 12 for supportingly connecting the left and right rotating mechanism coupling units 2 to the rotating mechanism coupling unit revolution shaft 11 in such a way as to be symmetrical to each other on left and right sides; and a rotational force generator base 13 for supporting the rotating mechanism coupling unit revolution shaft 11.

(3) The left and right rotating mechanism coupling units 2 include left and right rotating mechanism coupling arms 21 for supportingly connecting the one or more blade revolution shaft rotating mechanisms 3 located on the left and right sides from the central portion of the rotational force generator to each other in a horizontal direction; and blade revolution shaft supports 22 located on both sides of the left and right rotating mechanism coupling arms at given intervals in such a way as to fit the blade revolution shafts 31 thereto. In FIG. 2, however, the blade revolution shaft 31 is not provided to maximize the left and right areas of the blades 35, and each blade rotation shaft 34 is divided into a revolution arm coupling blade rotation shaft 341 integrated with the blade revolution arm 32 and a blade coupling blade rotation shaft 342 that is cylindrical to surround the blade revolution shaft 31 and coupled to the corresponding blade 35 in such a way as to rotate together with the corresponding blade 35.

In this case, desirably, left and right blade revolution phase interlockers 24 are disposed on the left and right rotating mechanism coupling arms 21 to allow the blade revolution arms 32 of the blade revolution shaft rotating mechanisms 3 to interlock with each other and rotate with planar symmetry, and each blade revolution phase interlocker 25 includes a plurality of spur gears, bevel gears, or crank mechanisms. In FIG. 5, however, if one blade revolution shaft rotating mechanism 3 has three or more blades 35, revolution phase differences among the blades 35 of the left and right blade revolution shaft rotating mechanisms 3 are not big, and accordingly, it is desirable that the left and right blade revolution phase interlockers 24 be not provided.

Further, in this case, if the left and right rotating mechanism coupling units 2 are provided with two or more left and right rotation mechanism coupling arms 21 up and down along the vertical direction, a left and right rotation mechanism coupling column 23 is additionally provided to vertically connect and support the central portion of each left and right rotation mechanism combination arm 21.

(4) Each blade revolution shaft rotating mechanism 3 includes: the blade revolution shaft 31 fitted to the corresponding blade revolution shaft support 22 and extending in a vertical direction; the two or more blade revolution arms 32 extending radially around the blade revolution shaft 31 at the same revolution distance and phase interval as each other; blade rotation shaft supports 33 disposed on the ends of the blade revolution arms 32; blade rotation shafts 34 fitted to the blade rotation shaft supports 33 and extending in vertical directions; and a revolution and rotation gear shifting interlocker 36 for shifting the rotational force of the blade revolution shaft 31 and transmitting the shifted rotational force to the blade rotation shafts 34 so that the blade rotation shafts 34 rotate at an angular velocity 0.5 times higher than the blade revolution shaft 31 in the opposite direction to the rotational direction of the blade revolution shaft 31.

In this case, the blade revolution shaft 31 is divided into a revolution arm coupling blade revolution shaft 311 rotating at the same angular velocity as the blade revolution arms 32 and a revolution arm separation blade revolution shaft 312 rotating at a different angular velocity from the blade revolution arms 32.

Figure 3:
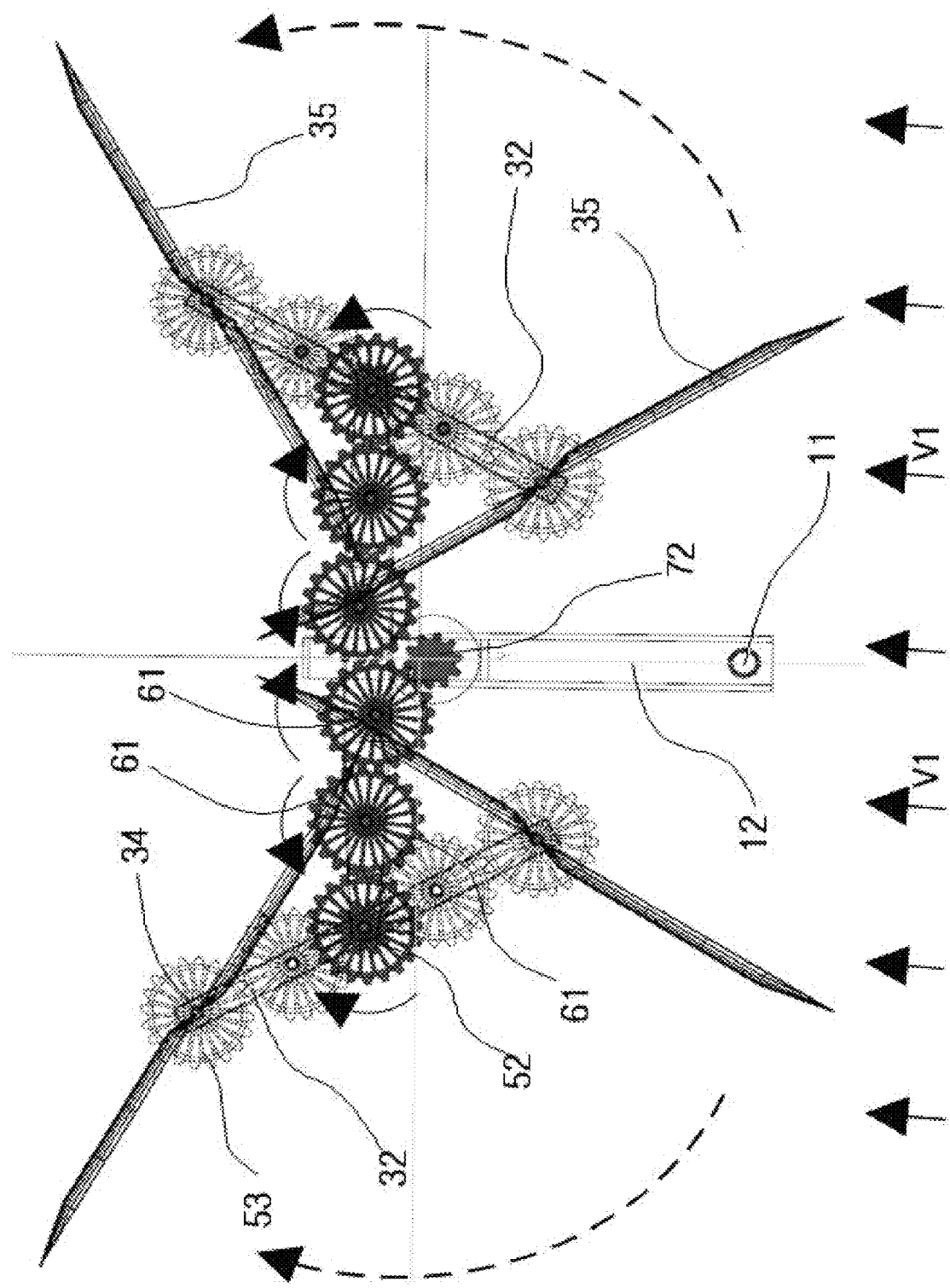
FIG. 3 is a top view showing a process in which rotation and revolution of the blades interact with each other and the rotational forces are transmitted between blade revolution shaft support gears and blade rotation shaft gears in the embodiment of FIG. 2.
Figure 6:
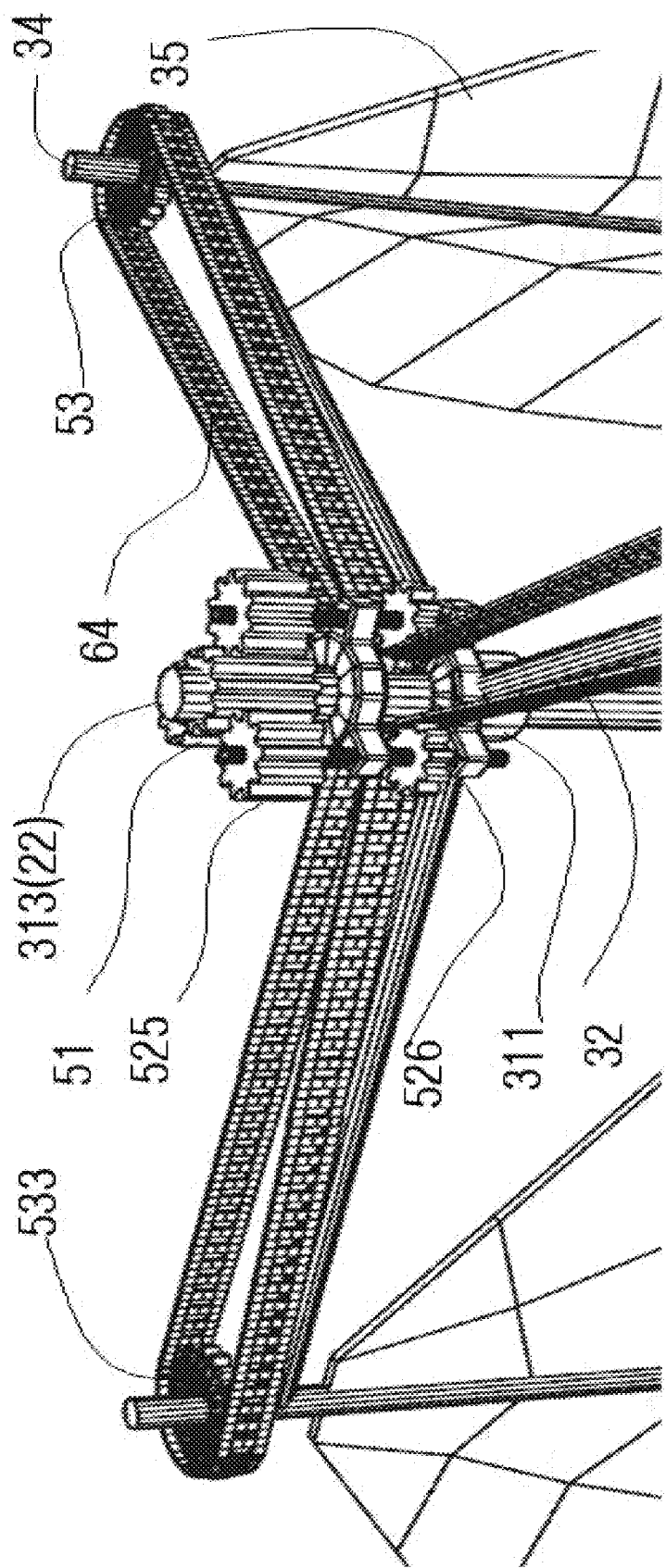
FIG. 6 is an enlarged perspective view showing a portion where the rotational forces are transmitted by means of the gear combinations and chain belts to explain an operating principle in the embodiment of FIG. 5.

(5) As shown in FIGS. 3 and 6, the revolution and rotational gear shifting interlocker 36 includes: a blade revolution shaft support gear 51 having the shape of an external teeth protruding from the blade revolution shaft support 22 toward the blade revolution shaft 31 in such a way as to surround the blade revolution shaft 31; a blade rotation shaft gear 53 fixedly coupled to the corresponding blade rotation shaft 34; and a rotational force transmission part 6 disposed between the blade revolution shaft support gear 51 and the blade rotation shaft gear 53 to perform the gear shifting of the rotational force and the transmission of the shifted rotational force.

(6) Each blade 35, which has two thin curved bodies with almost the same shape and area in such a way as to be coupled to have line symmetry around the corresponding blade rotation shaft 34, is fixedly coupled to the blade rotation shaft 34.

Figure 7:
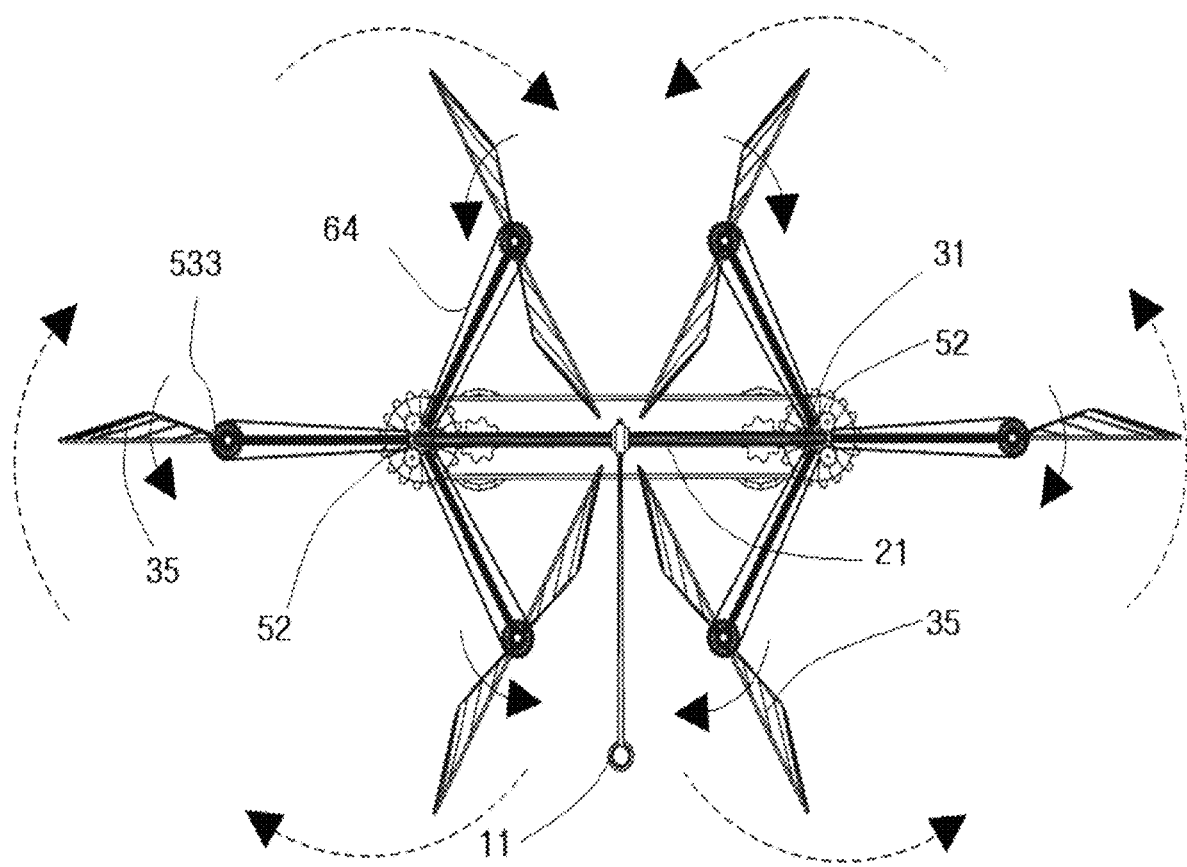
FIG. 7 is a schematic top view showing the rotational directions in the revolution and rotation of the blades and the process of transmitting the rotational forces in the embodiment of FIG. 5.

(7) As shown in FIG. 7, referring to a relation between the revolution phase angle and the rotation phase angle of each blade 35, in two revolution phases at which the horizontal direction where the left and right rotating mechanism coupling arms 21 extend and the revolution orbit of the corresponding blade rotation shaft 34 cross each other, in the case of one revolution phase, the horizontal direction where the left and right rotating mechanism coupling arms 21 extend is parallel with the horizontal direction along which the left and right edges of each blade 35 are connected to each other, and in the case of the other revolution phase, they have a difference of 90° from each other.

Further, the rotational force generator according to the present invention has the following additional solution means.

Figure 11:
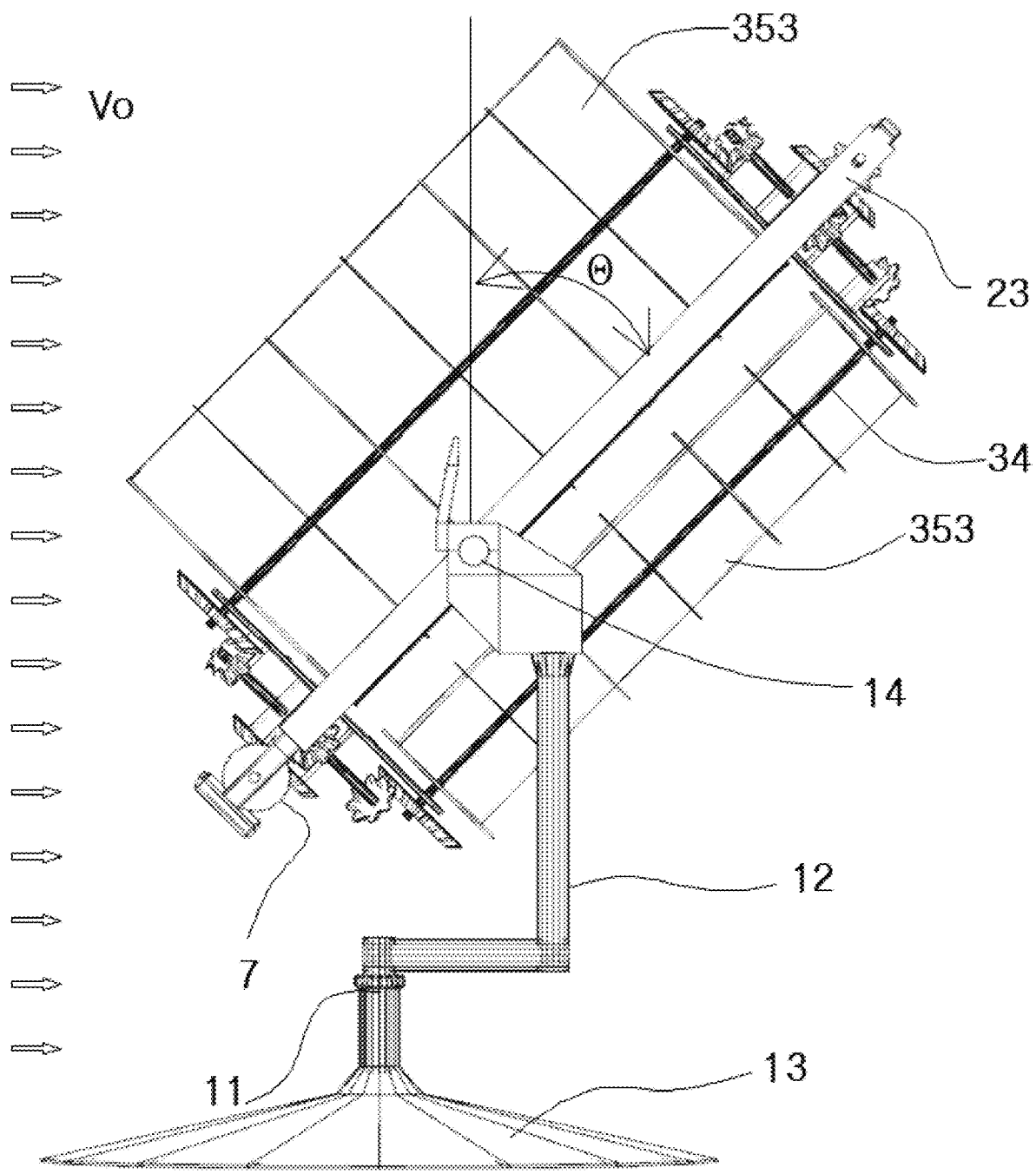
FIG. 11 is a central cross-section side view showing an operating principle where the left and right rotating mechanism coupling units are inclined forward by means of the pressure generated in the flowing direction of a fluid in the embodiment of FIG. 10.
Figure 12:
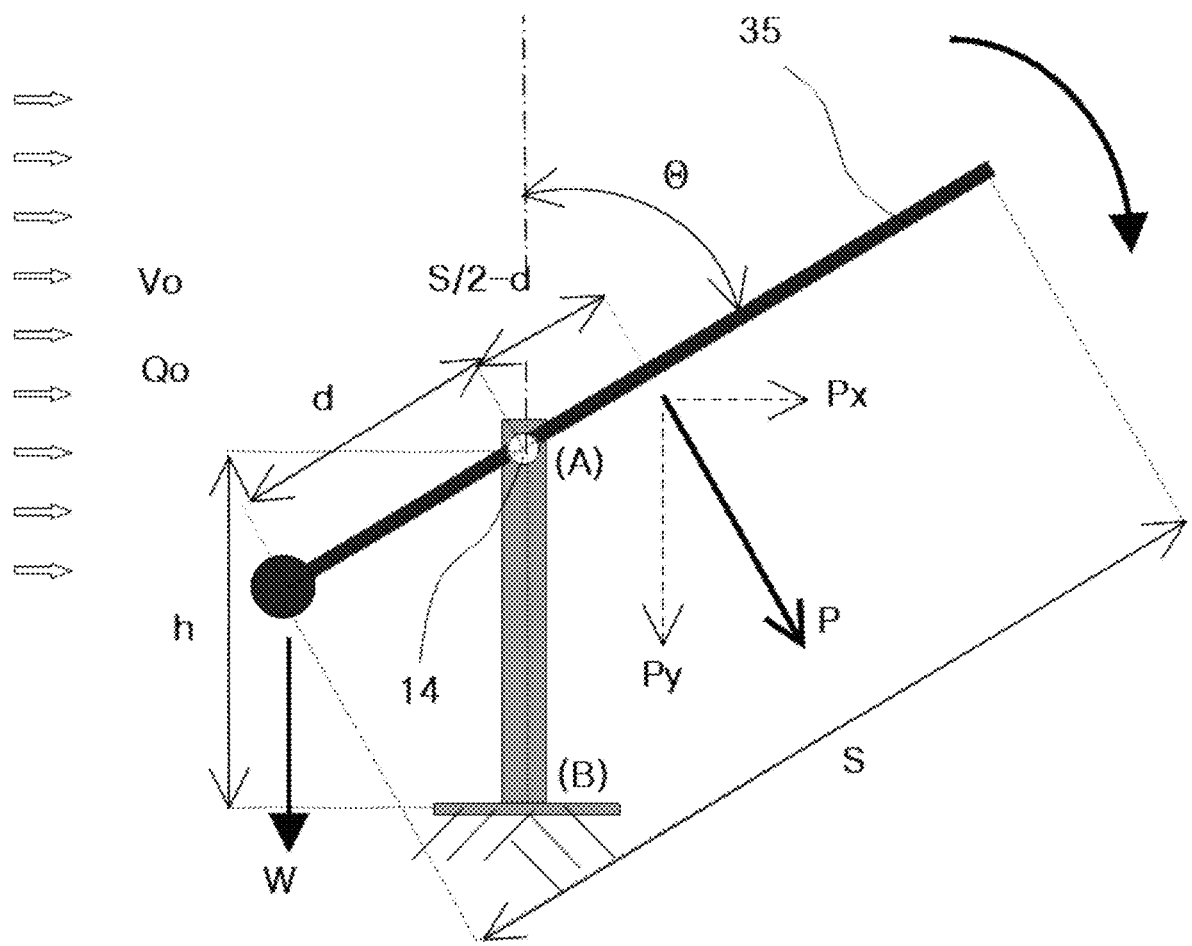
FIG. 12 is a concept view showing dynamic relations among the flow velocity of the fluid, the inclinations of the left and right rotating mechanism coupling units, and the overturning moment of a rotating mechanism coupling unit support in the embodiment of FIG. 11.

(1) As shown in FIGS. 11, 12, and 19, the left and right rotating mechanism coupling units 2 are hinge-coupled to the ends of the rotating mechanism coupling unit revolution arms 12 by means of a rotating mechanism coupling unit rotating horizontal shaft 14 as a rotary shaft extending in a horizontal direction thereof, so that the left and right rotating mechanism coupling units 2 perform arc reciprocating motions whose inclinations are varied according to the changes in the flow velocity and pressure of the fluid.

Figure 13:
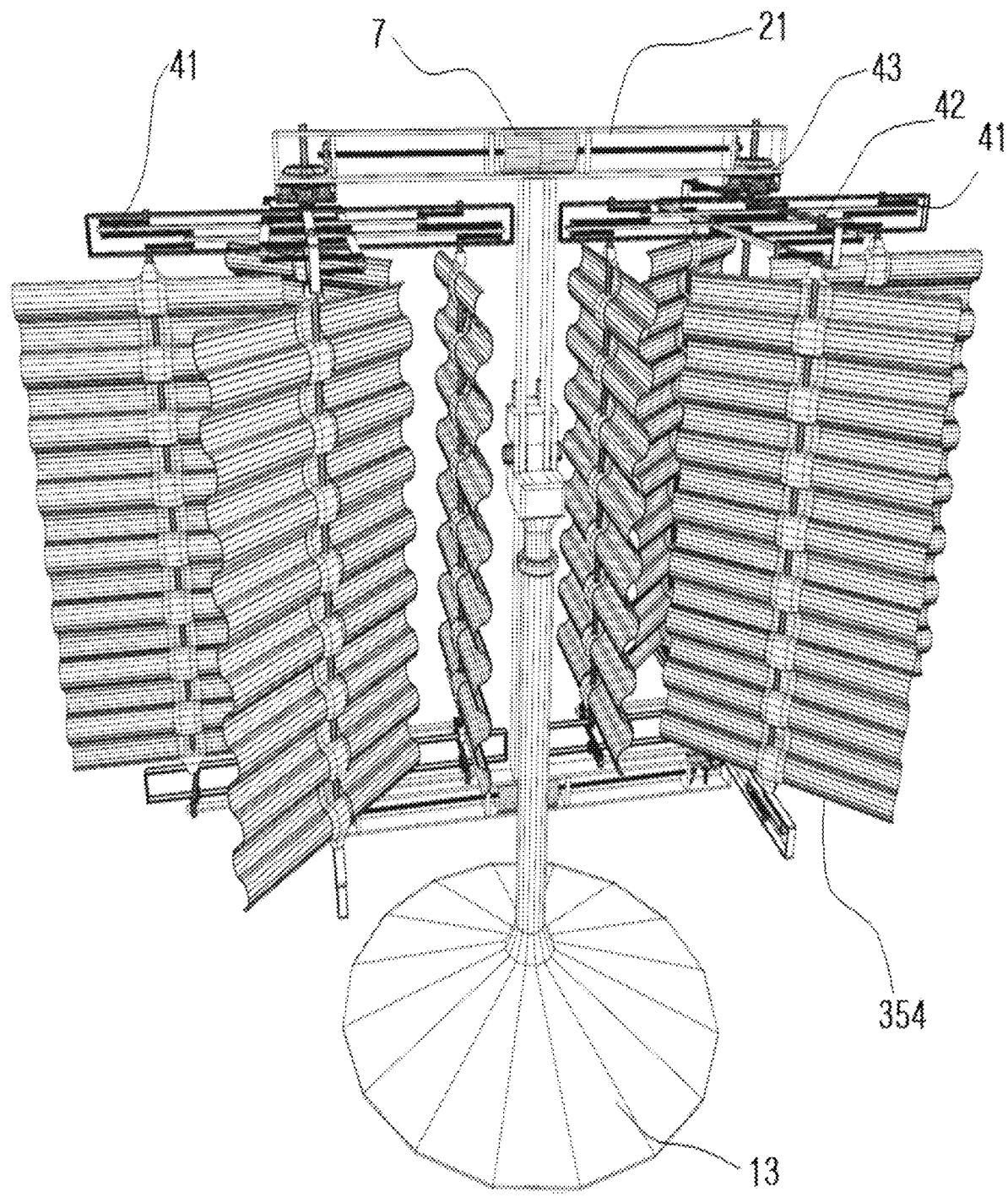
FIG. 13 is a perspective view showing a rotational force generator according to still another embodiment of the present invention in which two blade revolution shaft rotating mechanisms each having four blades are coupled to each other with planar symmetry and rotate up and down around a rotating mechanism coupling unit rotating horizontal shaft to transmit rotational forces by means of a plurality of crank mechanisms.

(2) As shown in FIGS. 11 and 13, each blade 35 has a straight line horizontal sectional area with no concave and convex shapes and a vertical sectional area with concave and convex shapes or protrusions, so as to induce the fluid to flow in the horizontal direction thereof after the flowing fluid has collided against the surface thereof.

Figure 14:
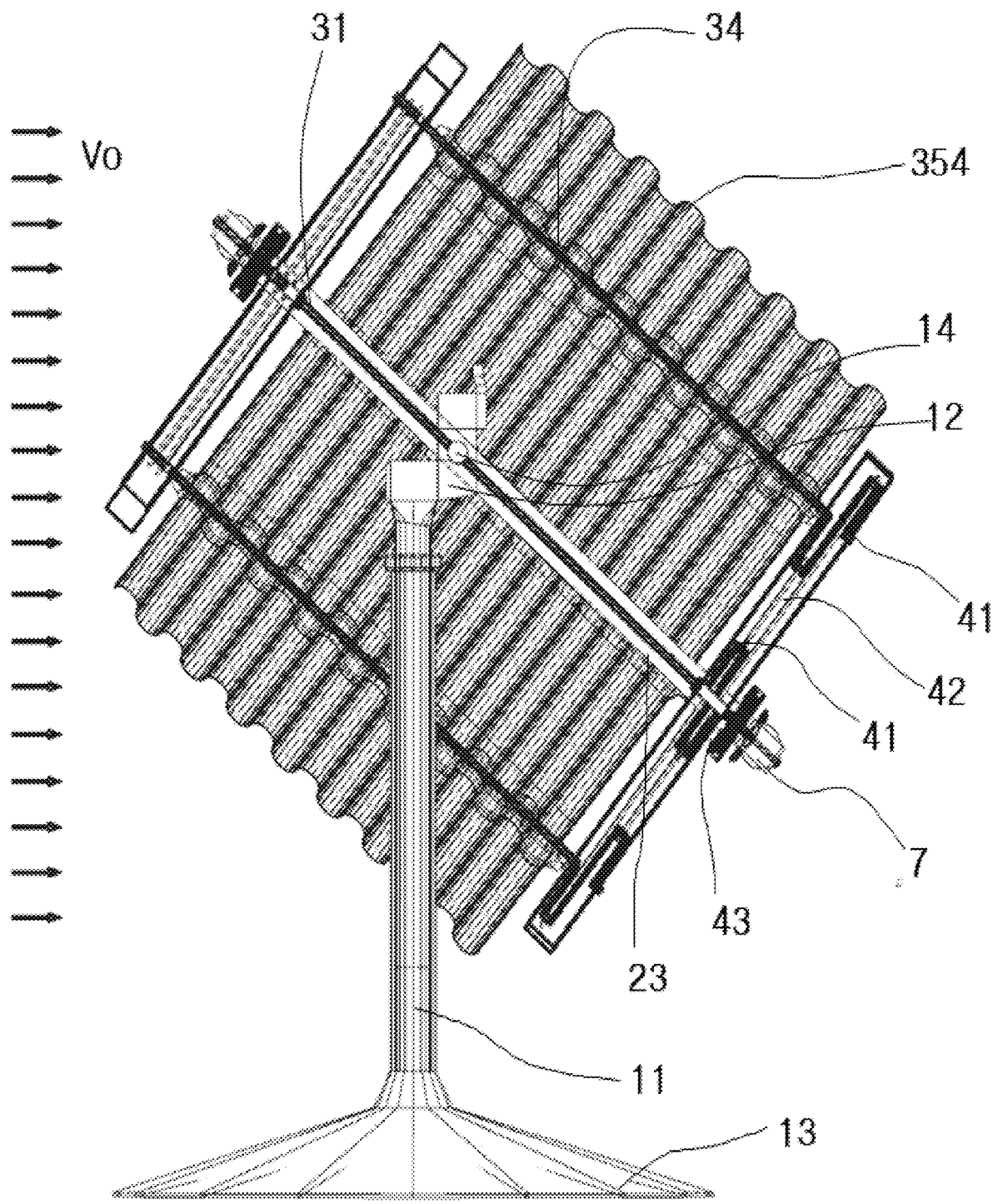
FIG. 14 is a side view showing an operating principle where the left and right rotating mechanism coupling units are inclined backward by means of the pressure generated in the flowing direction of a fluid in the embodiment of FIG. 13.
Figure 15:
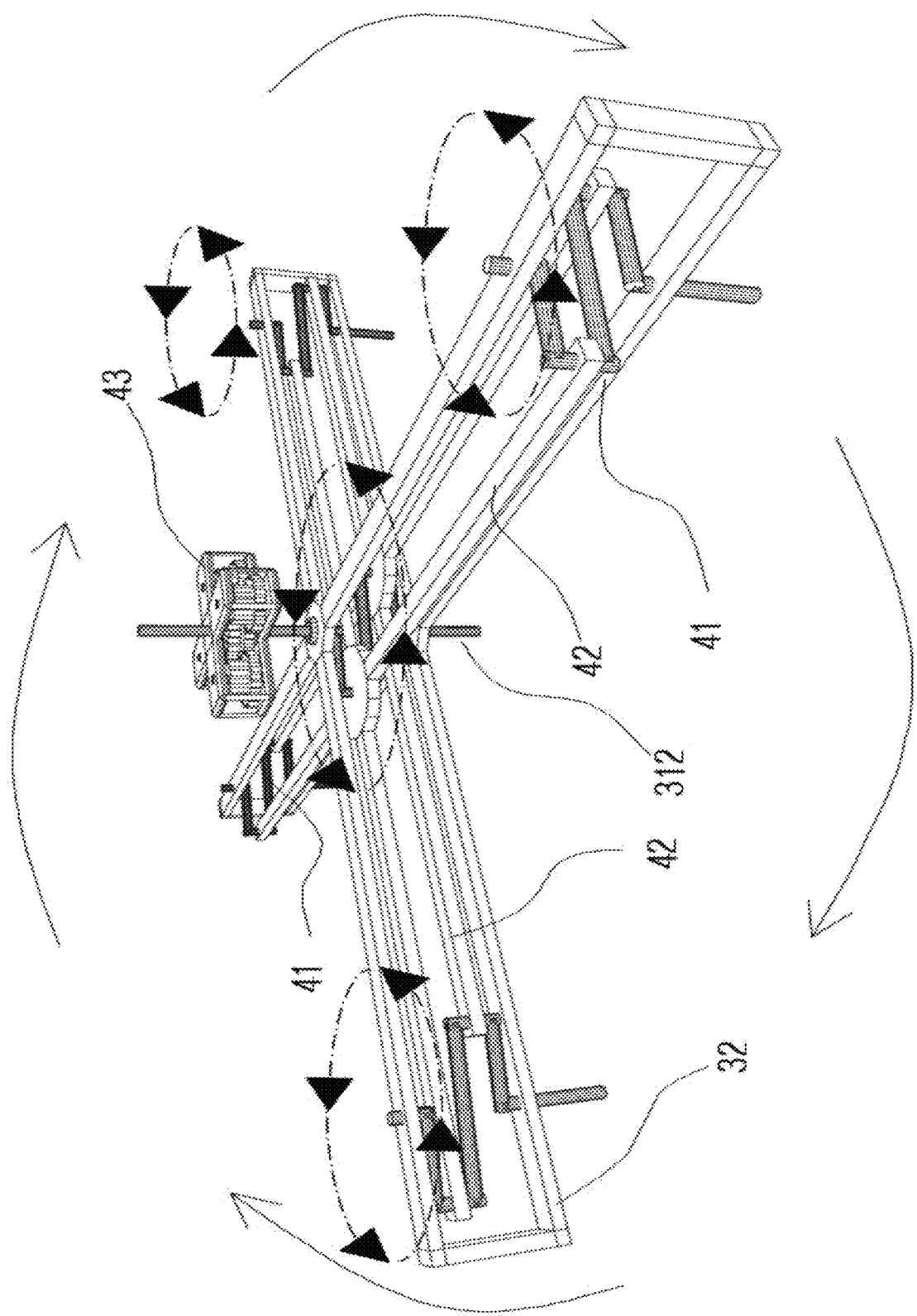
FIG. 15 is a perspective view showing a process of transmitting the rotational forces from the blade revolution shaft to the four blade rotation shafts by means of two radial crank pin connection arms and five crank mechanisms that have point symmetry and revolve around the blade revolution shaft.

(3) As shown in FIGS. 13 to 15, two or more crank mechanisms 41 each having a crank shaft 411, a crank arm 412, and a crank pin 413 are fixedly coupled up and down to the ends of the blade revolution shaft 31 and the corresponding blade rotation shaft 34 of each blade revolution shaft rotating mechanism 3 at the intervals of the same phase angle of the crank arm 412.

The crank pin 413 of the blade revolution shaft 31 and the crank pin 413 of the blade rotation shaft 34 having the same rotating phase angle are hinge-coupled to revolution and rotation crank interlocking arms 42 extending radially around the crank pins 413 of the blade revolution shaft 31 and rotating in place, so that the crank pin 413 of the blade revolution shaft 31 and the crank pin 413 of the blade rotation shaft 34 interlock with each other and revolve around the respective crank shafts 411 at the same phase angle and angular velocity.

Figure 16:
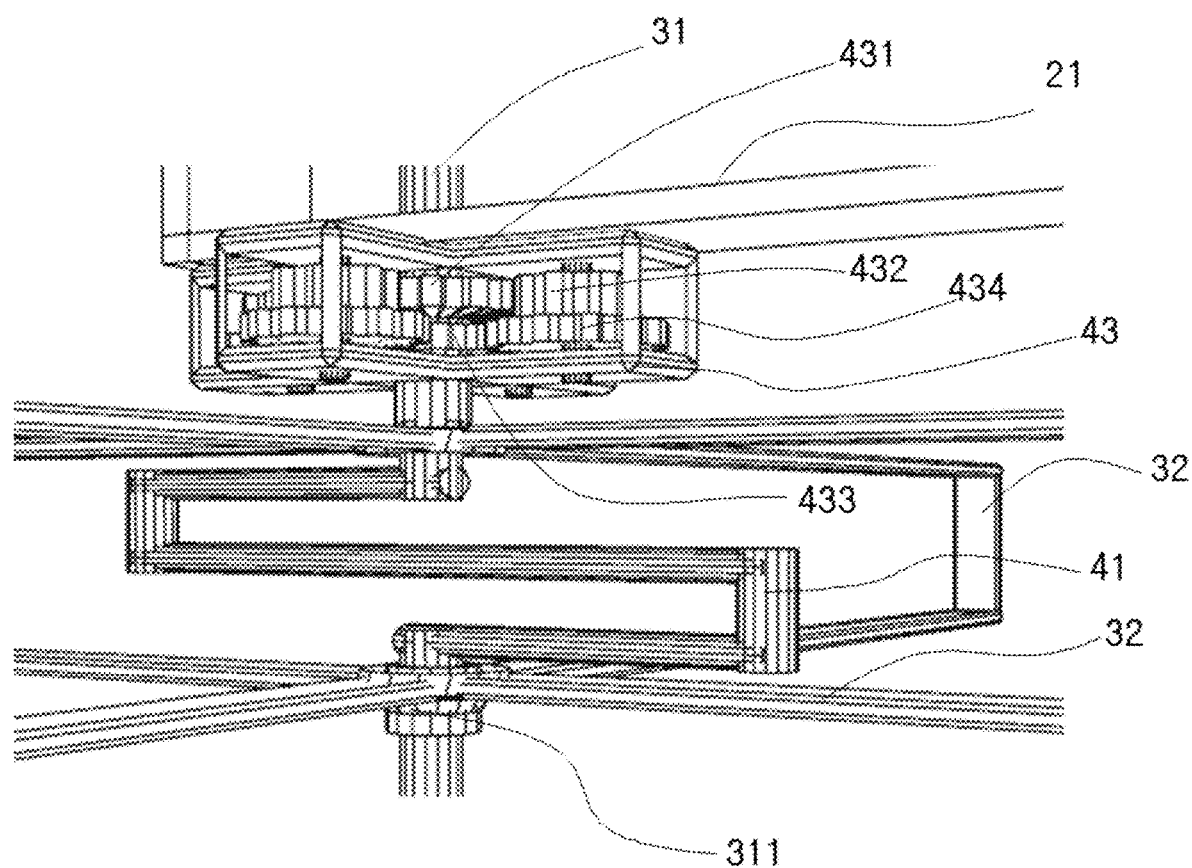
FIG. 16 is a perspective view showing an operating principle of a revolution and rotation gear shifting planetary gear for shifting rotation angular velocity of the blade revolution shaft and the blade rotation shaft to become 0.5 times higher than the revolution angular velocity of the blade and transferring the shifted angular velocity.

As shown in FIGS. 15 and 16, a revolution and rotation gear shifting spur gear 43 having a sun gear and planet gears is disposed between the blade revolution shaft 31 and the blade revolution shaft support 22 in such a way as to be fixedly coupled to one surface of the left and right rotating mechanism coupling arms 21 to allow a rotating angular velocity of the blade revolution shaft 31 is 0.5 times higher than the revolving angular velocity of the blade rotation shaft. In this case, the blade revolution shaft 31 is divided into the revolution arm separation blade revolution shaft 312 coupled to the crank mechanism 41 and the revolution arm coupling blade revolution shaft 311 as a cylindrical member surrounding the revolution arm separation blade revolution shaft 312 in such a way as to be coupled to the blade revolution arms 32.

<Operating Principle>

(1) As shown in FIGS. 2 and 5, the left and right rotating mechanism coupling units 2 are symmetrical with each other and perform revolutions at given distances around the rotating mechanism coupling unit revolution shaft 11.

Accordingly, even if the flows of the fluid are changed frequently and no additional direction control power is supplied, the entire blade surface is pushed against the pressure of the fluid flowing, so that as each blade 35 with the left and right symmetrical structure perpendicular to the direction of the flow of the fluid automatically moves to be located on the lowermost stream of the flow of the fluid, the blade 35 receives the biggest pressure from the flow of the fluid to generate the rotational force to the maximum.

(2) As shown in FIG. 3, if each blade 35 receives the pressure, it revolves around the blade revolution shaft 31.

In this case, since the blade revolution shaft support gear 51 is fixedly coupled to the blade revolution shaft support 22, without any rotation, a driven spur gear 61 of the revolution and rotation gear shifting interlocker 36 disposed between the blade revolution shaft support gear 51 and the blade rotation shaft gear 53 rotates, while revolving around the blade revolution shaft support gear 51, and through the revolution and rotation gear shifting interlocker 36, the rotational speed of the blade revolution shaft 31 is shifted at an angular velocity 0.5 times higher than the angular velocity in the opposite direction thereto and transmitted to the blade rotation shaft gear 53, so that the blade 35 performs rotation and revolution simultaneously.

Figure 4:
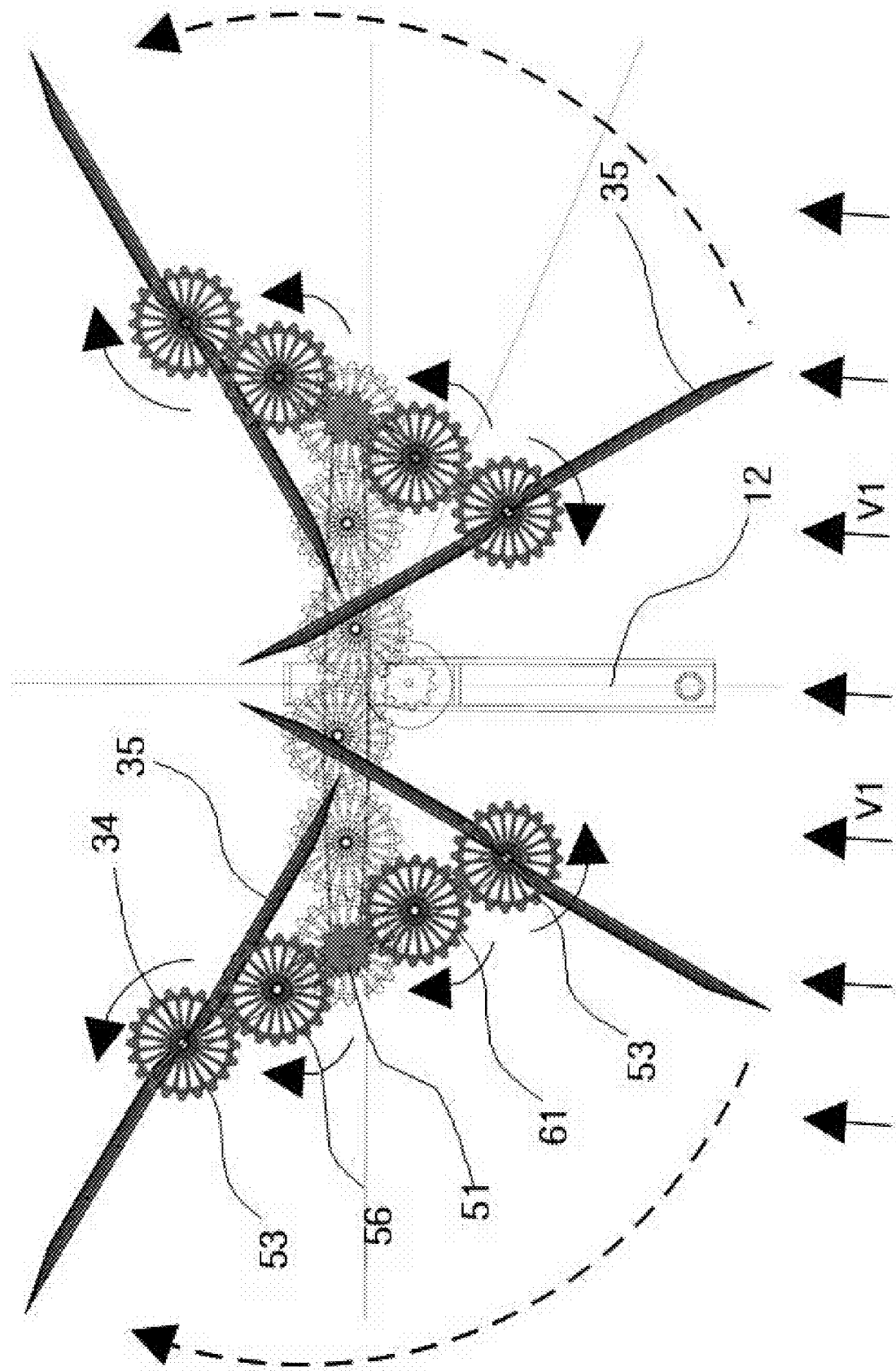
FIG. 4 is a top view showing a process in which a left blade revolution shaft gear and a right blade revolution shaft gear interact with each other and a method and order for transmitting the rotational force to a central generator in the embodiment of FIG. 2.

(3) As shown in FIG. 4, the blade revolution shaft gear 52 is fixedly coupled to each blade revolution shaft 31.

Further, the left and right blade revolution phase interlockers 24 are disposed on the left and right blade revolution shaft gears 52 to interlockingly rotate in the opposite direction to each other at the same angular velocity, and each blade revolution phase interlocker 25 includes the plurality of spur gears, bevel gears, or crank mechanisms. Further, a generator 7 is disposed on the center of the left and right blade revolution phase interlockers 24 to receive the rotational forces.

(4) As shown in FIG. 5, the rotational force generator has three blades 35 coupled to one blade revolution shaft 31 and transmits driving forces through chain belts 64. The structure and method where the rotational forces are transmitted are the same as shown in FIG. 6 or 23. Like this, if three blades 35 are coupled to one blade revolution shaft 31, the width of each blade 35 becomes only maximum two times bigger than the revolution radius, as shown in FIG. 7. However, if two blades 35 are coupled to one blade revolution shaft 31, as shown in FIG. 2, the width of each blade 35 becomes 2*(2^0.5)=2.8 times bigger than the revolution radius.

(5) As shown in FIGS. 10 to 14, in the case where the flow velocity and pressure of the fluid are increased due to strong winds or floods, the acting point of the entire resultant force of the pressure of the fluid applied to the blades 35 is located above the rotating mechanism coupling unit rotating horizontal shaft 14.

In this case, the upper portions of the left and right rotating mechanism coupling units 2 are inclined toward the direction of the flow of the fluid, and contrarily, if the acting point is located under the rotating mechanism coupling unit rotating horizontal shaft 14, the left and right rotating mechanism coupling units 2 are inclined in the opposite direction thereto to lower an elevation angle.

Accordingly, the orthographic projection areas of the left and right rotating mechanism coupling units 2 in the direction of the flow of the fluid become reduced, thereby suppressing the rotational force generator from collapsing or turning over due to the pressure of the fluid.

As the left and right rotating mechanism coupling units 2 are inclined, further, the rotating direction forces of the blades 35 in the pressure of the fluid in the direction of the flow of the fluid are gradually reduced, and therefore, if degrees of sensitivity (weights, center of gravity, blade areas, acting points of pressure, etc.) causing the left and right rotating mechanism coupling units 2 to be inclined are appropriately controlled according to the flow velocity and pressure of the fluid, the revolution speeds of the blades 35 are automatically controlled to be within an appropriate range, without the supply of any additional power.

(6) FIG. 15 shows an operating mechanism of a crank type revolution and rotation interlocker 4 in which two +-shaped radial crank pin connection arms 42 for interlocking one blade revolution shaft crank mechanism 41 and four blade rotation shaft crank mechanisms 41 revolve together at point symmetrical positions with each other around the blade revolution shaft 31, thereby transmitting rotational forces to the blade rotation shafts 34, without the generation of any eccentric loads. If the number of blade rotation shafts is three, each radial crank pin connection arm 42 has the shape of Y, and if the number of blade rotation shafts is two, each radial crank pin connection arm 42 has the shape of I.

Further, FIG. 16 shows an operating mechanism of the revolution and rotation gear shifting spur gear 43 reducing the revolution angular velocity of the blades 35 to ½ and transmitting the reduced angular velocity to the blade revolution shaft 31. That is, the revolution and rotation gear shifting spur gear 43 is fixedly coupled to the left and right rotating mechanism coupling arms 21, and the revolution arm coupling blade revolution shaft 311 surrounds the revolution arm separation blade revolution shaft 312, so that if the blades 35 revolve, a revolution arm coupling sun gear 433 fixed to the revolution arm coupling blade revolution shaft 311 rotates in place and gear-shifted by means of the combination of the planet gears therearound to reduce the rotation angular velocity of a revolution shaft coupling sun gear 431 fixed to the revolution arm separation blade revolution shaft 312 to 0.5 times and transmit the reduced angular velocity.

<Mechanical Analysis of Fluid>

Figure 8:
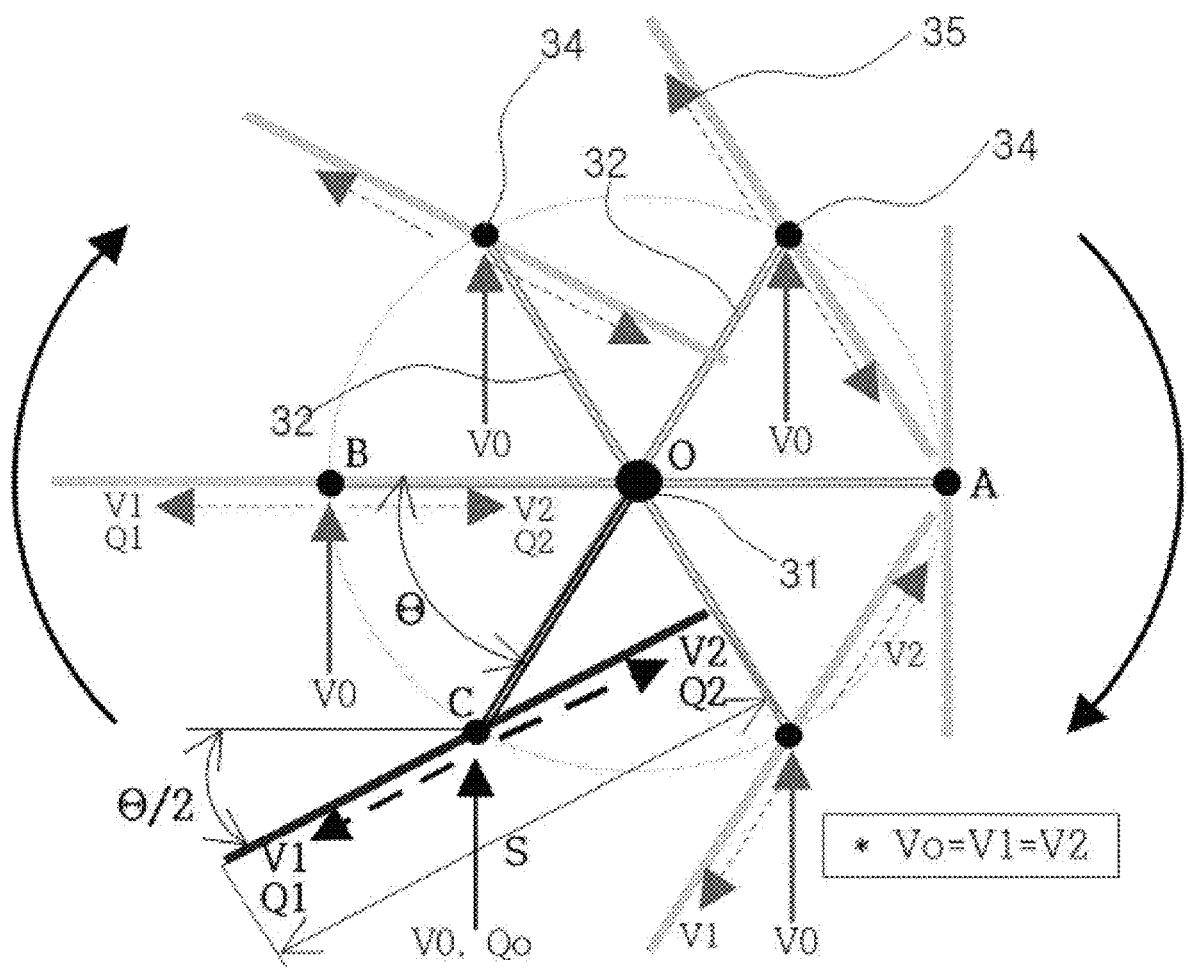
FIGS. 8 and 9 are concept views showing the dynamic relation between the revolution and rotation phase angles of the blades and the torque generated on the blade revolution shaft in the embodiment of FIG. 5.
Figure 9:
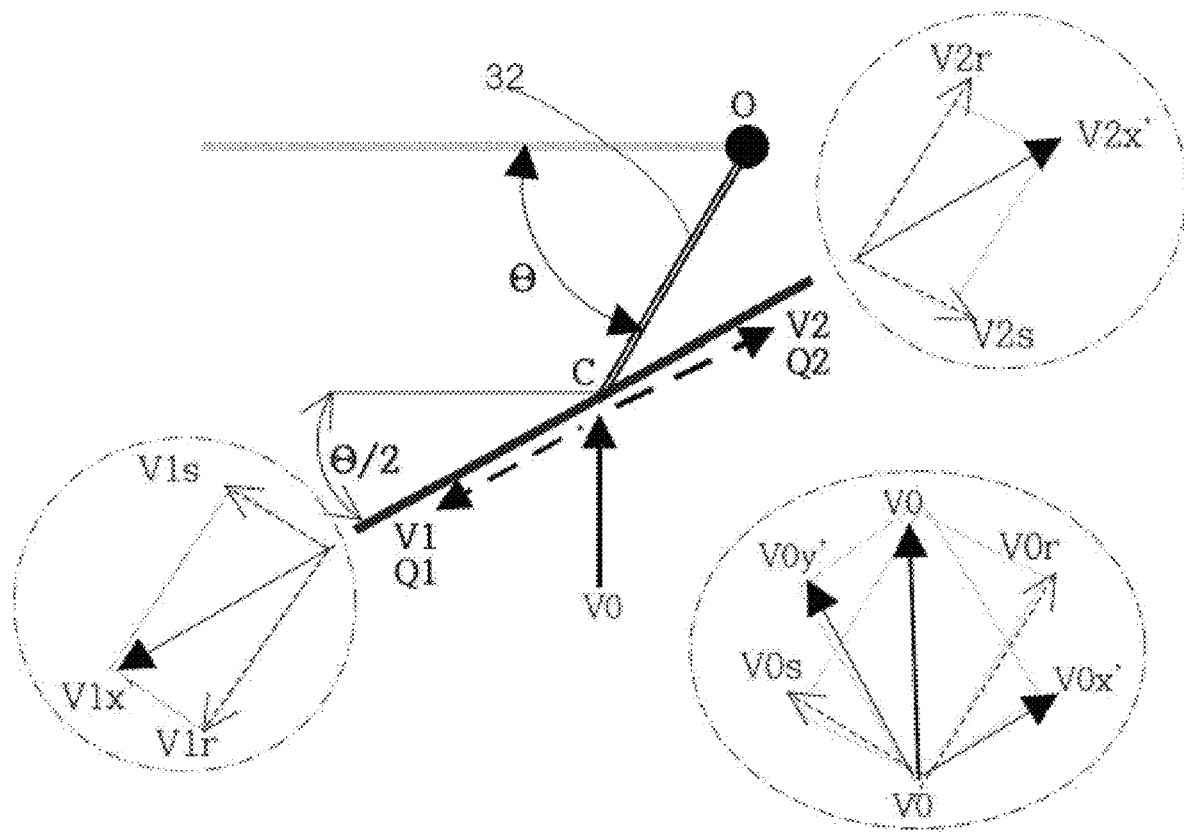
Figure 10:
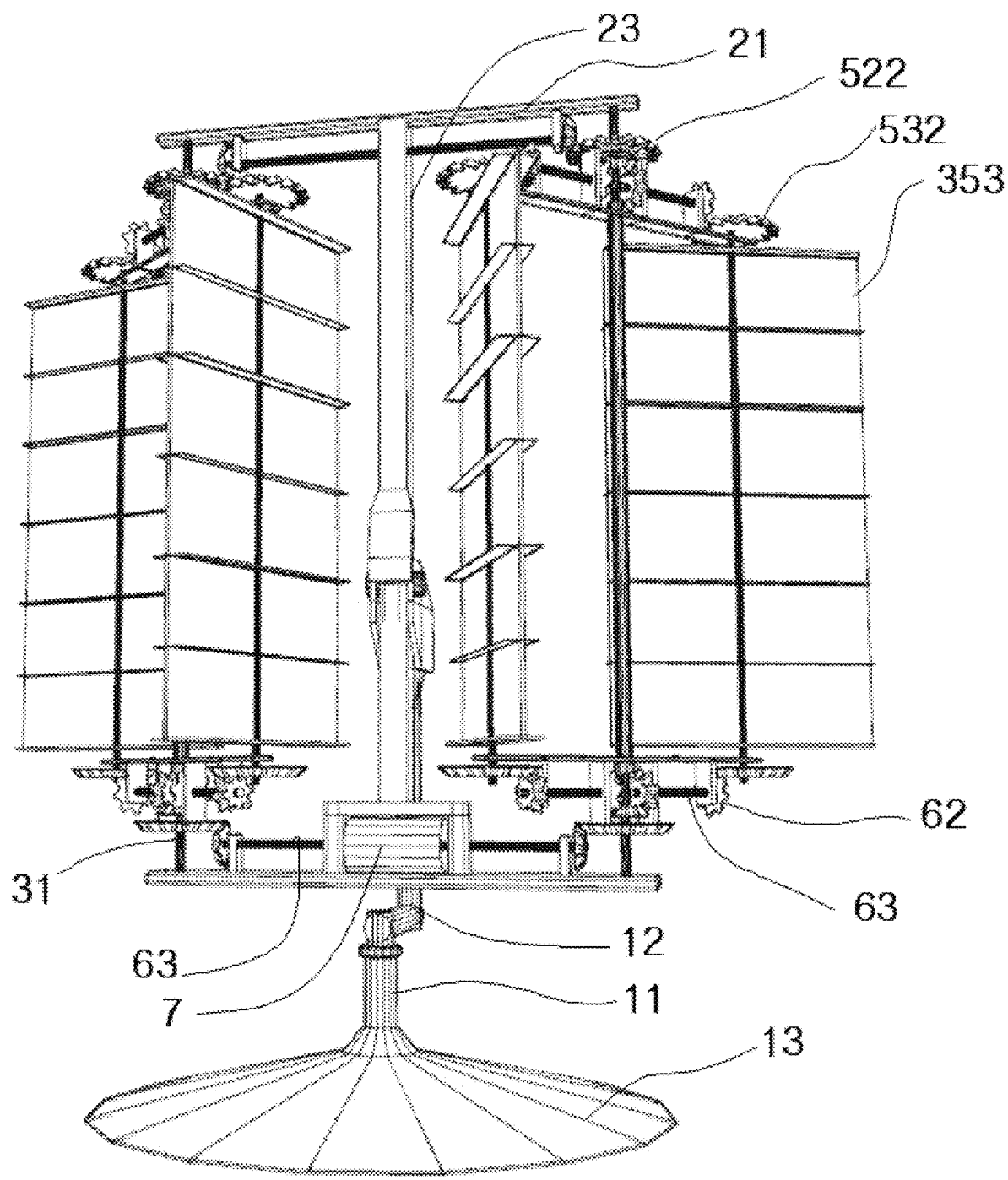
FIG. 10 is a perspective view showing a rotational force generator according to yet another embodiment of the present invention in which left and right rotating mechanism coupling units to which rotational forces are transmitted by means of bevel gears rotate up and down around a rotating mechanism coupling unit rotating horizontal shaft.

(1) Referring to rotational force generating efficiency, if the flow velocities of fluids are the same, the rotational force generator according to the present invention generates a rotational force two or more times higher than the existing vertical rotating shaft type generator, which will be explained mechanically with reference to FIGS. 8 and 9 on the stationary time points when the blades 35 start to move.

First, it is assumed that a revolution radius of the blade 35 is R, a span of the blade 35 is S, a density of the fluid is $\rho$, a position of the blade revolution shaft 31 is O, a position of the blade rotation shaft 34 at a revolution base point where the revolution phase angle is 0 is B, a position of the blade rotation shaft 34 when the revolution phase angle is θ is C, a flow rate of fluid hitting one blade 35 revolving is Qo, a flow velocity of fluid flowing backward along the surface of the blade among the fluid hitting the blade 35 is V1 and a flow rate thereof is Q1, and a flow velocity of fluid flowing forward along the surface of the blade 35 is V2 and a flow rate thereof is Q2. Further, it is assumed that on a coordinate system (x'-axis, y'-axis) of the surface direction of the blade 35 with respect to the blade rotation shaft 34, a direction toward the blade surface is the x'-axis and a direction vertical thereto is the y'-axis; on a coordinate system (s-axis, r-axis) in an orbital direction of the blade 35, a tangential direction is the s-axis and a radius direction is the r-axis; and on a coordinate system (x-axis, y-axis) in a horizontal plane direction, a horizontal direction is the x-axis and a vertical direction is the y-axis. Torque and moment per unit height of the blade 35 are calculated as follows:

$$Qo = S * \text{Cos}(\theta/2) * Vo. \quad (a)$$

Accordingly, the momentum Fo per unit time of Qo is ρ*Qo*Vo=ρ*S*Cos (θ/2)*Vo^2

(b) The flow velocity in the x'-y' axis direction of Qo is as follows.

$$Vox' = Vo * \text{Sin}(\theta/2),$$
$$Voy' = Vo * \text{Cos}(\theta/2)$$

(c) In the case of ΣFx'=0, $$\rho * Qo * Vo * \text{Sin}(\theta/2) = -\rho * Q1 * V1 + \rho * Q2 * V2$$

(d) Since there is no difference in pressure in the y' direction at point C, Vo=V1=V2

$$\text{In } Qo = Q1 + Q2,$$
$$Q1 = 0.5 * Qo * \{1 - \text{Sin}(\theta/2)\}$$
$$Q2 = 0.5 * Qo * \{1 + \text{Sin}(\theta/2)\}$$

(e) A driving force Fs required in a tangential direction to a revolution orbit of the blade rotation shaft is as follows.

$$Fs = \Delta(m * V)s = \rho * Qo * Vo * \text{Cos}(\theta) - \rho * Q1 * V1s + \rho * Q2 * V2s$$
$$V1s = V2s = Vo * \text{Sin}(\theta/2)$$

Accordingly, ρ*Q1*V1s=0.5*ρ*Qo*Vo*{1−Sin (θ/2)}*{Sin (θ/2)}

$$\rho * Q2 * V2s = 0.5 * \rho * Qo * Vo * \{1 + \text{Sin}(\theta/2)\} * \{\text{Sin}(\theta/2)\}$$
$$Qo = Vo * S * \text{Cos}(\theta/2)$$

Accordingly, Fs=ρ*S*(Vo^2)*Cos (θ/2)*[Cos (θ)+{Sin (θ/2)}^2]

In this case, {Sin (θ/2)}^2=0.5*{1−Cos (θ)}

Accordingly, Fs(θ)=0.5*ρ*S*(Vo^2)*Cos (θ/2)*{1+Cos (θ)}

$$Ms(\theta) = 0.5 * \rho * S * R * (Vo^\wedge 2) * \text{Cos}(\theta/2) * \{1 + \text{Cos}(\theta)\}$$

In this case, it is assumed that a=0.5*Cos (θ/2)*{1+Cos (θ)}.

Accordingly, the torque by revolution phase θ, Ms(θ)= ρ*S*R*(Vo^2)*a (f) If a=0.5*Cos (θ/2)*{1+Cos (θ)} is integrated, [2*sin (θ/2)−(2/3)*sin³(θ/2) is produced, and if integration is performed from 0 to 180°, 1.312 is produced.

Accordingly, the instant maximum value of the torque produced while the blade is rotating to 360°, Ms(max)=Ms (0)=ρ*S*R*(Vo^2), and the total average value, Ms(ave)= Ms(max)*(1.312*2)/(2π)=0.417*Ms(max).

Figure 1D:
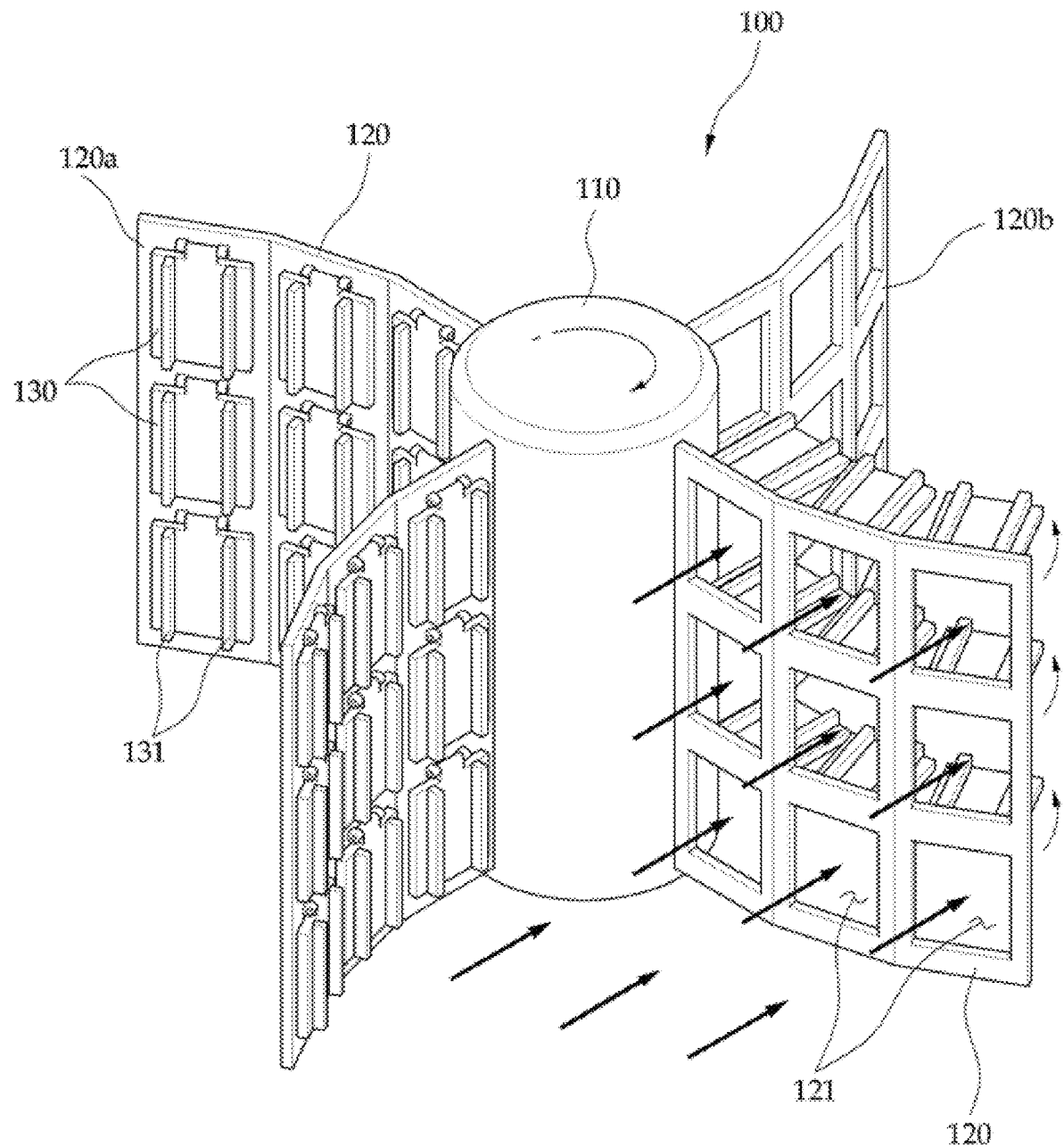
FIG. 1d is a representative figure of Patent literature 4.

Further, in the case of the existing vertical rotary shaft wind generator as shown in FIG. 1*d*, torque is produced only in the range of the phase angle between −90° to 90°. V1s=V1*Cos (θ), V2s=0. Further, the orthographic projection area of the blade 35 in the direction of V0 is S*Cos (θ).

If it is assumed that the torque by phase angle is Ms'(θ), Ms'(θ)=0.5*ρ*S*R*(Vo^2)*Cos (θ)*{1+Cos (2θ)}.

In this case, if it is assumed that a=0.5*Cos (θ)*{1+Cos (2θ)} and integration is performed, the result is [3/4*Sin (θ)+1/12*Sin (3θ)], and if the integration from −90° to 90° is performed, the value is 1.312.

(g) Therefore, if it is assumed that the instant maximum value of the torque produced while the blade is rotating to 360° (2π radian), Ms'(max)=Ms'(0)=ρ*S*R*(Vo^2), and the average value is Ms'(ave), Ms'(ave)=Ms'(max)*(1.312)/(2π)=0.209*Ms'(max)

(h) Even if the backward (−) torque caused by the movement of the blade 35 against the flow of the fluid is not produced at all when the blade of the existing vertical rotary shaft wind generator passes through the phase angle of 90 to 270°, the average amount of torque generated from the rotational force generator according to the present invention, 0.417*M(max) is two times larger than 0.209*M(max) generated from the existing vertical rotary shaft wind generator.

(2) Referring to safety improvement efficiency, in the case where the pressure of the fluid is increased due to strong winds or floods, the rotational force generator according to the present invention has a lower degree of risk of overturning and collapse than the existing vertical rotary shaft wind generator and drastically prevents the blades 35 from rotating at excessive velocities.

When a strong wind with a speed of 30 m/s (108 km per hour) blows, for example, in the case where the left and right rotating mechanism coupling units 2 are designed to be inclined by 60° in the range from the elevation angle of 90° to the elevation angle of 30° around the rotating mechanism coupling unit rotating horizontal shaft 14, the overturning moment applied to the rotating mechanism coupling unit support 1 of the rotational force generator according to the present invention is reduced to about ⅛ of the overturning moment of the existing vertical rotary shaft wind generator, and the torque applied to the blade of the rotational force generator according to the present invention is reduced to about ¼ of the torque of the existing vertical rotary shaft wind generator. This will be explained mechanically with reference to FIG. 12.

First, it is assumed that the vertical length s of the blade 35 facing the flow of the fluid is 5 m, the horizontal length b thereof is 5 m, an inclination θ with respect to a vertical direction is 60°, the weight of the blade 35 is 0, the counterweight of the lower portion of the blade is W, a distance between the rotating horizontal shaft and the bottom of the blade is d, the height h of the rotating horizontal shaft is 3 m, a flow velocity Vo is 30 m/sec, and a flow rate is Qo, and the overturning moment and the rotational force of the blade are calculated as follows.

$$Qo = Vo*s*b*\text{Cos}(\theta) \qquad (a)$$

(b) The pressure of fluid applied to the blade, P=ρ*Qo*Vo*Cos (θ)=ρ*s*b*(Vo^2)*[Cos (θ)]^2

(c) At the point of A, ΣM=0, and accordingly, W*d*Sin (θ)=P*(s/2−d)

W={0.5/Sin (θ)}*P*(s/d−2), and in this case, if it is assumed that k is d/s,

W=0.5*(1/k−2)*[Cos (θ)/Tan (θ)]*}*ρ**s*b*(Vo^2)

(d) At the point of B, ΣM=0, and accordingly, M_B+(Px)*h

In this case, Px=P*Cos (θ), and accordingly, M_B=ρ*s*b*h*(Vo^2)*[Cos (θ)]^3

(e) If 30 m/sec for Vo, 1.23 kg/m3 for air density, 60° for θ, 5 m for s, 5 m for b, and 3 m for the height h are substituted, P is 706.0 kgf, and the overturning moment applied to the base of the support shaft, M_B is 1,059.0 kgf*m.

(f) In this case, if k=d/s=0.3, the weight W of the counterweight is 543.4 kgf, and if k=0.4, W=203.8 kgf. The function of the counterweight is conveniently performed if a generator or capacitor is installed under the rotational force generator.

As shown in FIG. 14, if the rotating mechanism coupling unit rotating horizontal shaft 14 is located above the center of the vertical length s of the blade, no additional counterweight W is needed.

(g) If the strong wind (V=30 m/sec) is applied to the left and right rotating mechanism coupling units 2 being in a vertical state (θ=0), P=1.23*5*5*(300^2)*1/9.8=2,824.0 kgf.

$$M_B = 1.23*5*5*3*(300\wedge 2)*1/9.8 = 8,472.0 \text{ kgf}*m$$

(h) Accordingly, if the rotational force generator according to the present invention is applied to a wind generator, the bending moment applied to the support is drastically reduced (to ⅛ in the case of the inclination of 60°) even when the strong wind with a speed of 30 m/s (108 km per hour) blows, so that the risk of overturning or collapse is completely removed.

(i) Further, if the inclination θ of the blade 35 has 60° to cause [Cos (60)]^2=0.25, the pressure P (60°) of the fluid in the rotational direction of the blade 35 is 706 kgf, which is reduced to ¼ of the pressure P (90°) of 2,824 kgf in the vertical state, thereby basically removing the problems the existing wind generator has had, that is, the breakage of parts or materials due to the excessive rotation speeds of the blades 35, the abnormality occurrence of the generator due to excessive current, and the like.

The present invention may be modified in various ways and may have several exemplary embodiments. However, this does not limit the invention within specific embodiments and it should be understood that the invention covers all the modifications, equivalents, and replacements within the scope of the claims of the invention.

1: Rotating mechanism coupling unit support
11: Rotating mechanism coupling unit revolution shaft
12: Rotating mechanism coupling unit revolution arm
13: Rotational force generator base
14: Rotating mechanism coupling unit rotating horizontal shaft
2: Left and right rotating mechanism coupling units
21: Left and right rotating mechanism coupling arms
211: Left rotating mechanism coupling unit
212: Right rotating mechanism coupling unit
22: Blade revolution shaft support
23: Left and right rotating mechanism coupling column
24: Left and right blade revolution phase interlockers
241: Spur gear combination left and right interlocker
242: Bevel gear type left and right interlocker
3: Blade revolution shaft rotating mechanism
31: Blade revolution shaft
311: Revolution arm coupling blade revolution shaft
312: Revolution arm separation blade revolution shaft
313: Non-rotation blade revolution shaft
32: Blade revolution arm
33: Blade rotation shaft support
34: Blade rotation shaft
341: Revolution arm coupling blade rotation shaft
342: Blade coupling blade rotation shaft
35: Blade
351: Flat type blade
352: Concave blade
353: Partition type blade
354: Corrugated blade
36: Revolution and rotation gear shifting interlocker
362: Bevel gear rotation gear shifting interlocker
364: Chain belt type gear shifting interlocker
4: Crank type revolution and rotation gear shifting interlocker
41: Crank mechanism
411: Crank shaft
412: Crank arm
413: Crank pin
42: Radial crank pin connection arm
43: Revolution and rotation gear shifting planetary gear
431: Revolution shaft coupling sun gear
432: Revolution shaft interlocking planetary gear
433: Revolution arm coupling sun gear
434: Revolution arm interlocking planetary gear
5: Blade rotating shaft gear
51: Blade revolution shaft support gear
52: Blade revolution shaft gear
521: Blade revolution shaft spur gear
522: Blade revolution shaft bevel gear
523: Blade revolution shaft chain gear
524: Blade revolution shaft planetary gear
525: Revolution shaft support planetary gear
526: Revolution shaft planetary chain gear
53: Blade rotation shaft gear
531: Blade rotation shaft spur gear
532: Blade rotation shaft bevel gear
6: Rotational force transmission part
61: Driven spur gear
62: Driven bevel gear
63: Bevel gear long axis 64: Chain belt
7: Others
71: Generator
72: Generator rotating shaft
73: Generator shaft rotating gear
74: Crank connecting rod
76: Rudder

The invention claimed is:

1. A rotational force generator revolving and rotating according to a flow of a fluid, comprising:
   blade revolution shaft rotating mechanisms each including two or more blades spaced apart from one another at intervals of a same revolution phase angle, wherein each blade rotates around a blade rotation shaft while simultaneously revolving around a blade revolution shaft if a pressure is received from the flow of the fluid, thereby providing rotational force to the blade revolution shaft;
   at least one each left and right rotating mechanism coupling units disposed on each of left and right sides of a central portion of the rotational force generator; and
   a rotating mechanism coupling unit support for supporting the left and right rotating mechanism coupling units, allowing the left and right rotating mechanism coupling units to revolve to left and right sides at given intervals according to changes in flowing directions of the fluid,
   wherein the rotating mechanism coupling unit support comprises:
   a rotating mechanism coupling unit revolution shaft enabling the left and right rotating mechanism coupling units to revolve;
   rotating mechanism coupling unit revolution arms for connecting the left and right rotating mechanism coupling units to the rotating mechanism coupling unit revolution shaft in a manner that the left and right rotating mechanism coupling units are arranged symmetrically to each other; and
   a rotational force generator base for supporting the rotating mechanism coupling unit revolution shaft,
   wherein the left and right rotating mechanism coupling units comprise:
   left and right rotating mechanism coupling arms for connecting the blade revolution shaft rotating mechanisms located on the left and right sides from the central portion of the rotational force generator to each other in a horizontal direction; and
   blade revolution shaft supports located on sides of the left and right rotating mechanism coupling arms at given intervals and configured to receive and secure the blade revolution shafts,
   wherein each blade revolution shaft rotating mechanism comprises:
   the blade revolution shaft, which is fitted to the blade revolution shaft support and extends in a vertical direction;
   blade revolution arms extending in a horizontal direction around the blade revolution shaft at same revolution distances and same phase intervals respectively;
   blade rotation shaft supports disposed on ends of the blade revolution arms;
   the blade rotation shaft, which is fitted to the blade rotation shaft supports and extend parallel to the blade revolution shaft; and
   a revolution and rotation gear shifting interlocker, which transmits the rotating speed of the blade revolution shaft to the blade rotation shaft so as to rotate in an opposite direction to the rotating direction of the blade revolution shaft at an angular velocity that is 0.5 times the angular velocity of the blade revolution shaft,
   whereby each blade is fixedly coupled to the blade rotation shaft, each blade having two thin curved bodies and being joined around the blade rotation shaft, and
   wherein a relation between the revolution phase angle and a rotation phase angle of each blade is such that, at two revolution phases where the horizontal direction toward adjacent blade revolution shafts intersects with the revolution orbit of the blade rotation shaft, in one of the two revolution phases, a direction perpendicular to the surface of the blade is perpendicular to a direction where the left and right rotating mechanism coupling arms extend, and in the other of the two revolution phases, the direction perpendicular to the surface of the blade is parallel to the direction where the left and right rotating mechanism coupling arms extend,
   so that even when the flowing directions of the fluid are changed frequently, the left and right rotating mechanism coupling units rotate by the flow of the fluid and move toward a downward direction of the flow of the fluid, causing the rotating mechanism coupling unit revolution arms to align parallel to the flow of the fluid and the left and right rotating mechanism coupling units to face a direction perpendicular to the flow of the fluid, each blade has the rotation phase angle that enables to generate the rotational force to the maximum according to the respective revolution phase.

2. The rotational force generator according to claim 1, wherein, two or more crank mechanisms of the same size are fixedly coupled to the ends of each blade revolution shaft of the blade revolution shaft rotating mechanism and each blade rotation shaft, arranged in upward and downward directions around the crank shafts and spaced apart at same rotation phase intervals;
   two or more radial crank pin connection arms extending radially toward the blade rotation shafts around a crank pin of the blade revolution shaft are hinge-coupled between the crank pin of the blade revolution shaft and the crank pins of the blade rotation shafts, which have same rotation phase angle, to allow the crank pins to interlock with each other to revolve around the respective crank shafts at same phase angle and angular velocity;
   the blade revolution shaft support has a revolution and rotation gear shifting planetary gear, including a sun gear and planetary gears fixedly coupled therearound, to allow the rotation angular velocity of the blade revolution shaft to become 0.5 times higher than the revolution angular velocity of the blade revolution arms; and
   the blade revolution shaft includes a revolution arm separation blade revolution shaft, which is fixedly coupled to the crank mechanism, and a revolution arm coupling blade revolution shaft, which is a cylindrical member surrounding the revolution arm separation blade revolution shaft and coupled to the blade revolution arms,
   whereby vibrations and inertial resistance caused by eccentric load are not generated in the rotations of the crank mechanisms, and no additional friction energy loss occurs even if the lengths of the blade revolution arms extend to increase the rotational force.

3. The rotational force generator according to claim 1, wherein the central portion of the left and right rotating mechanism coupling units is divided into a left rotating mechanism coupling unit and a right rotating mechanism coupling unit, which are hinge-coupled to perform relative movements, thereby enabling the left and right internal angles with the central portion as a vertex, to increase and decrease; wherein the left rotating mechanism coupling unit and the right rotating mechanism coupling unit are hinge-coupled to the rotating mechanism coupling unit revolution arms; and wherein the rotating mechanism coupling unit revolution arms are hinge-coupled to the rotating mechanism coupling unit revolution shaft; and an extension spring having a distance-adjusting function is disposed between the central portion of the left and right rotating mechanism coupling units and the rotating mechanism coupling unit revolution shaft, whereby even if the flows of the fluid are changed frequently, the left and right rotating mechanism coupling units rotate around the rotating mechanism coupling unit revolution shaft to face the flow of the fluid on the front surfaces thereof.

4. The rotational force generator according to claim 1, wherein each blade has a straight-line shape in a horizontal section, devoid of concave and convex portions, while including a plurality of concave and convex portions or protrusions on a vertical section, thereby directing the fluid, after colliding against the blade, to flow along horizontal trenches on the surface of the blade, without scattering in all directions.

5. The rotational force generator according to claim 1, wherein the left and right rotating mechanism coupling units comprise:

two or more left and right rotating mechanism coupling arms disposed along the vertical direction;

a left and right rotating mechanism coupling column adapted to vertically connect and support a central portion of each the left and right rotating mechanism coupling arm; and a rotating mechanism coupling unit rotating horizontal shaft, which extends in a horizonal direction and is disposed on the left and right rotating mechanism coupling column, wherein a portion of the left and right rotating mechanism coupling column, located above a center of gravity in the vertical direction of the left and right rotating mechanism coupling units, is hinge-coupled to ends of the left and right rotating mechanism coupling unit revolution arms through the rotating mechanism coupling unit rotating horizontal shaft, allowing rotational movement in place and wherein as the flow velocity of the fluid is increased, inclinations of the left and right rotating mechanism coupling units become increased, thereby reducing dynamic load applied to the rotational force generator, unlike when the left and right rotating mechanism coupling units remain in the vertical states.

6. The rotational force generator according to claim 5, wherein the rotating mechanism coupling unit revolution shaft has a shape of a cylinder hinge-coupled to an intermediate portion of a vertical structure in a streetlight or a utility pole; allowing rotational movement to the left and right; and wherein the left and right rotating mechanism coupling units have a bird head-shaped front portion and a bird tail-shaped back portion; and below the rotating mechanism coupling unit rotating horizontal shaft, the left rotating mechanism coupling arm and the right rotating mechanism coupling arm are separated from each other in a way to be easily coupled to a vertical structure thereby enabling the left and right rotating mechanism coupling units to move in a manner providing good outer beauty.

\* \* \* \* \*